United States Patent
Lee et al.

[11] Patent Number: 6,154,484
[45] Date of Patent: *Nov. 28, 2000

[54] METHOD AND APPARATUS FOR EMBEDDING AUXILIARY DATA IN A PRIMARY DATA SIGNAL USING FREQUENCY AND TIME DOMAIN PROCESSING

[75] Inventors: Chong U. Lee, San Diego; Kamran Moallemi, Del Mar; Robert L. Warren, Cardiff, all of Calif.

[73] Assignee: Solana Technology Development Corporation, San Diego, Calif.

[ * ] Notice: This patent is subject to a terminal disclaimer.

[21] Appl. No.: 09/169,381

[22] Filed: Oct. 9, 1998

Related U.S. Application Data

[63] Continuation-in-part of application No. 08/764,096, Dec. 6, 1996, Pat. No. 5,937,000, which is a continuation-in-part of application No. 08/524,132, Sep. 6, 1995, Pat. No. 5,822,360.

[51] Int. Cl.[7] .................................................. H04B 1/69
[52] U.S. Cl. .......................... 375/130; 375/144; 370/495; 370/497; 370/529
[58] Field of Search ..................................... 375/130, 144, 375/148, 260, 347, 267; 370/493, 495, 497, 527, 529

[56] References Cited

U.S. PATENT DOCUMENTS

| | | |
|---|---|---|
| 3,845,391 | 10/1974 | Crosby . |
| 4,079,419 | 3/1978 | Siegle et al. . |
| 4,313,197 | 1/1982 | Maxemchuk . |
| 4,425,661 | 1/1984 | Moses et al. . |
| 4,534,054 | 8/1985 | Maisel . |
| 4,962,535 | 10/1990 | Kimura et al. . |
| 5,113,437 | 5/1992 | Best et al. . |
| 5,138,661 | 8/1992 | Zinser et al. . |
| 5,319,735 | 6/1994 | Preuss et al. . |
| 5,361,276 | 11/1994 | Subramanian . |
| 5,379,345 | 1/1995 | Greenberg . |
| 5,404,377 | 4/1995 | Moses . |
| 5,414,733 | 5/1995 | Turner . |
| 5,450,490 | 9/1995 | Jensen et al. . |
| 5,481,570 | 1/1996 | Winters . |
| 5,487,087 | 1/1996 | McCree et al. . |
| 5,521,937 | 5/1996 | Kondo et al. ............................ 375/206 |
| 5,561,687 | 10/1996 | Turner . |
| 5,568,514 | 10/1996 | McCree et al. . |
| 5,629,929 | 5/1997 | Blanchard et al. ...................... 370/201 |
| 5,694,426 | 12/1997 | McCree et al. . |
| 5,768,307 | 6/1998 | Schramm et al. ....................... 375/208 |
| 5,937,000 | 8/1999 | Lee et al. ................................. 375/200 |

*Primary Examiner*—Don Vo
*Attorney, Agent, or Firm*—Barry R. Lipsitz; Ralph F. Hoppin

[57] ABSTRACT

Auxiliary data is transported in subbands of a primary data signal by hiding the data in the form of colored noise. The colored noise has a spectrum that simulates the spectrum of the primary data signal in each subband. The data to be transported is first converted to a spread spectrum signal. The primary data signal is analyzed to determine its spectral shape. The same spectral shape is imparted to the spread spectrum signal in each subband, which is then combined with the primary data signal for transmission. The spectral shaping can be performed using time domain modeling and synthesis such as linear predictive coding. A plurality of different auxiliary information streams can be transported on the primary data signal. By adjusting the gain of individual spread spectrum signal carrier(s) and the power of the colored noise, the auxiliary information stream(s) can be rendered at any desired level below or above an interference threshold in the primary data signal.

86 Claims, 21 Drawing Sheets

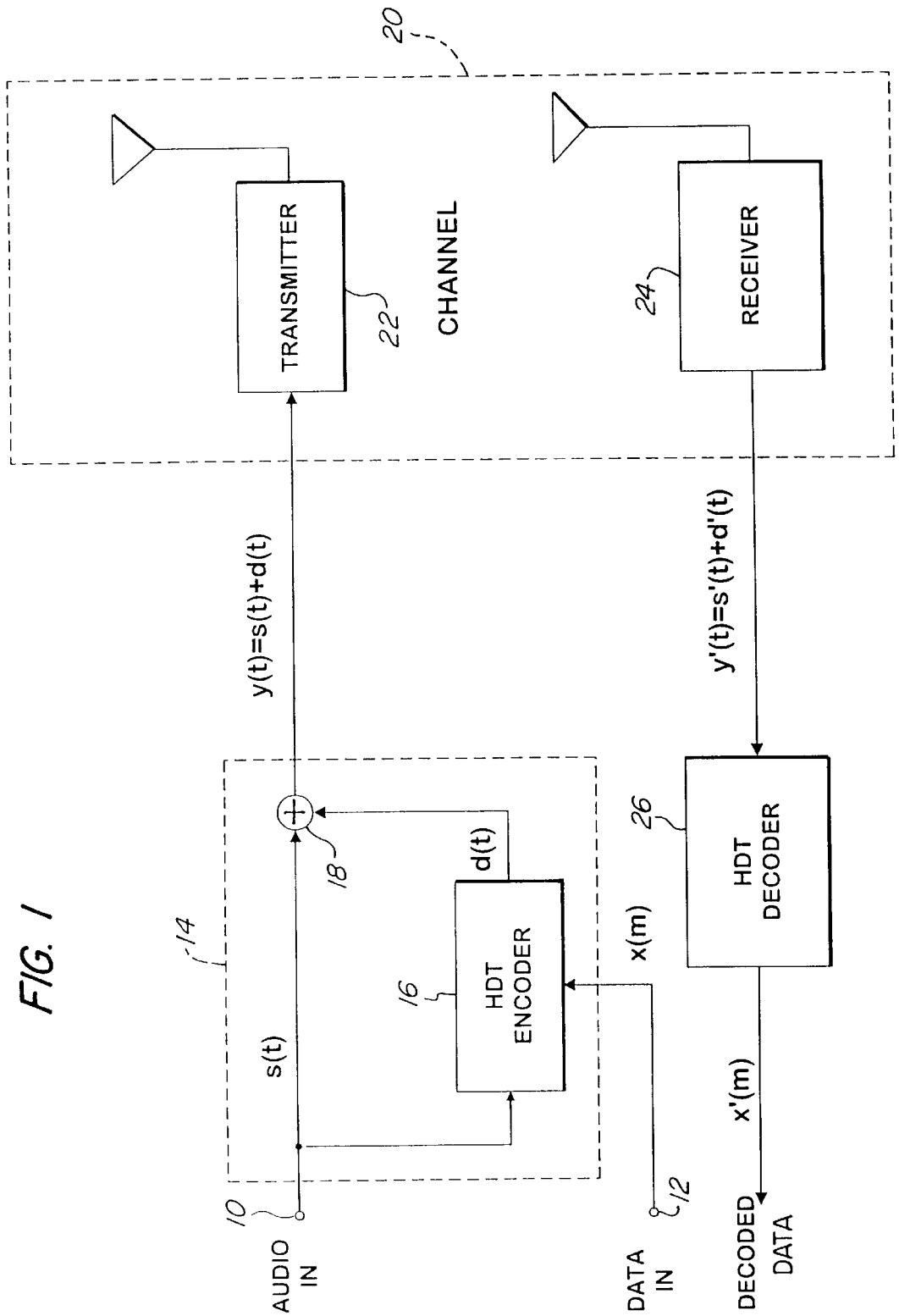

| FIG.5(c)-1 | FIG.5(c)-2 |

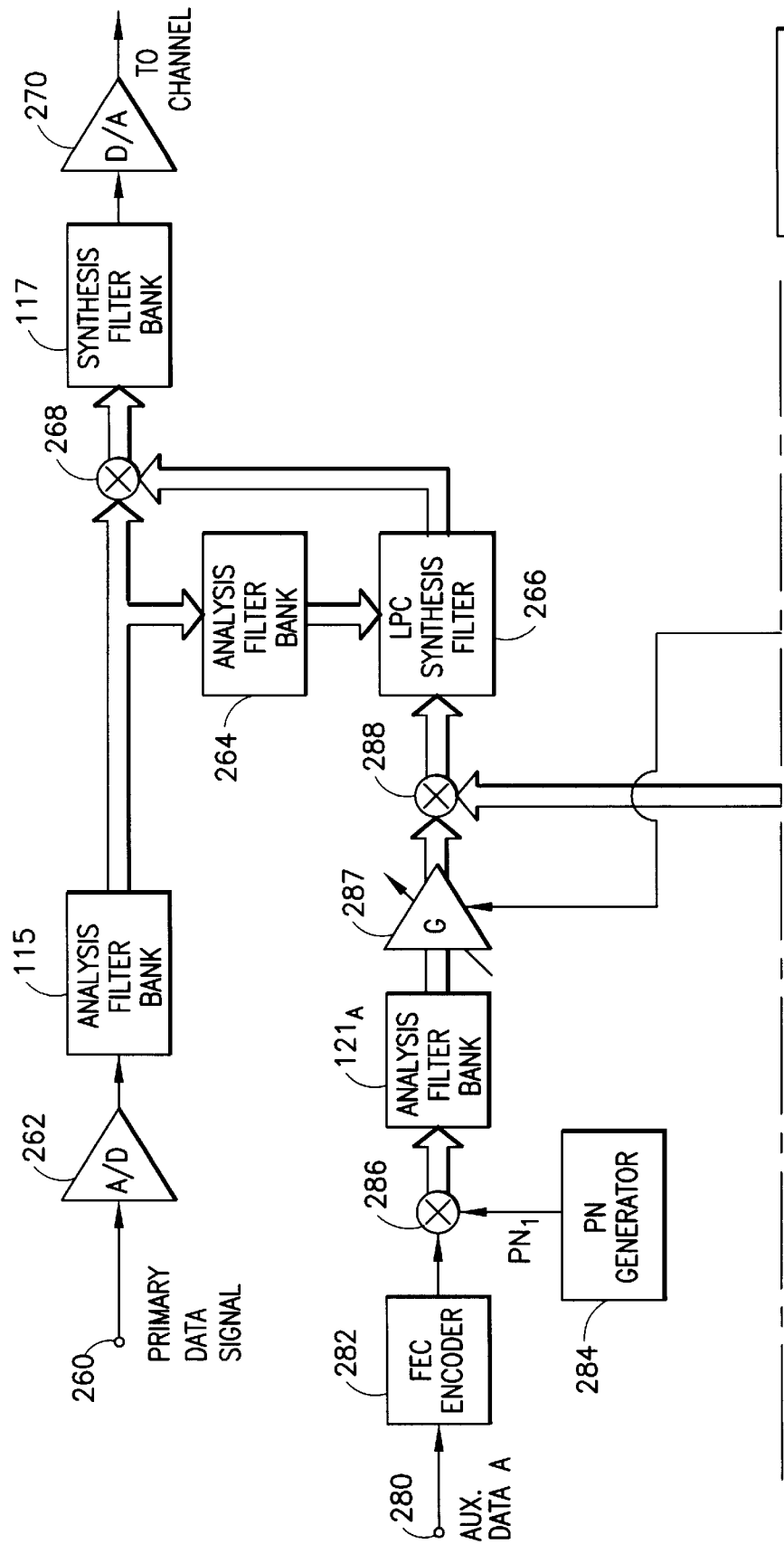

METHOD AND APPARATUS FOR EMBEDDING AUXILIARY DATA IN A PRIMARY DATA SIGNAL USING FREQUENCY AND TIME DOMAIN PROCESSING

This is a continuation-in-part of U.S. patent application Ser. No. 08/764,096, filed Dec. 6, 1996, to C. Lee et al., entitled "Method and Apparatus for Embedding Auxiliary Data in a Primary Data Signal," now U.S. Pat. No. 5,937,000, which is a continuation-in-part of U.S. patent application Ser. No. 08/524,132, filed Sep. 6, 1995, to C. Lee et al., entitled "Method and Apparatus for Transporting Auxiliary Data in Audio Signals," now U.S. Pat. No. 5,822,360, issued Oct. 13, 1998, both of which are incorporated herein by reference.

BACKGROUND OF THE INVENTION

The present invention relates to a method and apparatus for embedding (e.g., hiding) data in a primary or host data signal, and more particularly to a scheme for inserting one or more auxiliary data signals into a primary data signal being communicated over existing channels. The primary data signal may include an electromagnetic or acoustic signal, for example, which provides an analog or digital representation of the data. Methods and apparatus for recovering the embedded data from the primary data signal are also disclosed, along with specific applications of the invention.

Recently, techniques have been developed for increasing the amount of information that can be carried within a channel of a given bandwidth. For example, techniques for compressing digital data to squeeze more data within a given bandwidth or storage space are well known.

Another approach to communicating additional data within a given bandwidth is to identify areas where supplemental information can be transported with a primary signal, without adversely affecting the transport of the primary signal itself. Such techniques can be used in combination with known compression methods. One such technique is the transport of data together with a primary data signal, where the bandwidth of the channel remains as is, and additional information is packed with the primary data such that the additional information can be retrieved without substantially degrading the quality of the primary data signal.

One method for embedding digital information in a primary data signal such as an audio signal is disclosed in U.S. Pat. No. 5,319,735, entitled "Embedded Signalling." This patent discloses the generation of a code signal representing a sequence of code symbols to be embedded, the code signal having frequency components essentially confined to a preselected signaling band lying within and less than the bandwidth of the audio signal. The audio signal is continuously frequency analyzed over a frequency band encompassing the signaling band. The code signal is dynamically filtered as a function of the analysis to provide a modified code signal with frequency component levels which, at each time instant, are essentially negligibly small outside the signaling band. At each frequency within the signaling band, the frequency component levels of the modified code signal are essentially a preselected proportion of the levels of the audio signal frequency components in a corresponding frequency range. The modified code signal is combined with the audio signal to provide a composite audio signal.

The frequency analysis and dynamic filtering is accomplished using a large bank of bandpass filters, which leads to a rather complicated and expensive implementation that may have limited practical value. Additionally, the computational requirements are multiplied by the number of bandpass filters.

It would be advantageous to provide a more robust scheme for hiding data in a primary data signal. For example, it would be advantageous to hide data in a primary audio data signal that has frequency components below, in, and/or above the audible range. Such a scheme should enable a plurality of different data streams to be carried with the primary data signal without substantially altering the quality of the primary data signal, where different data streams may be provided at different data rates and combined in any number of ways prior to being added to the primary data signal.

Moreover, different data streams or combinations thereof should also be able to be added to the primary data signal in a "cascade" approach after other streams have already been added to the primary data signal. The combined data streams should be able to be provided at different levels (i.e., with different gains) in the primary data signal, and the power of the combined streams should be adjustable to maintain the combination at a desired level within the primary data signal.

Further, the type of information carried by the primary data signal should be virtually unlimited. For example, it would be advantageous to allow data that is completely unrelated to the primary data signal to be carried. Similarly, it would be advantageous to enable data ancillary to the primary data to be carried, such as data for effecting a copy protection scheme which precludes the primary data signal from being copied without proper authorization, or for otherwise controlling the use of the program or other information (e.g., video or multimedia) which is associated with the primary data signal.

Information identifying the content of the primary data signal, such as the name and/or performers of an audio or video program, or the manufacturer or distributor of a primary data signal stored on a source media such as compact disc or magnetic tape, and polling information for market research or commercial verification might also be hidden using such a scheme. Further, the scheme should allow the hiding of either a modulated carrier, an unmodulated carrier (e.g., pilot), or a combination of both in the primary data signal.

In particular, the technique should overcome practical limitations, including computational loads, that occur with moderate to high Linear Predictive Coding (LPC) orders with LPC-based Hidden Data Transport (HDT) encoding techniques. With LPC-based HDT encoding techniques, as the LPC order (N) is increased, modeling of the primary data signal becomes more accurate, and the auxiliary data can be embedded more precisely, e.g., with a more precise power level and spectral shaping. However, the computational complexity of the autocorrelation and filtering used in LPC increase linearly with N, and the computational complexity of the LPC analysis using Durbin's recursion increase with $N^2$.

Accordingly, it would be advantageous to use frequency and time domain processing to provide auxiliary data in a number of subbands of a primary data signal, where the model order can be reduced in each subband relative to a full band implementation for comparable spectral modeling performance. The frequency and time domain technique should further provide improved spectral modeling of deep spectral valleys and spectral floors relative to a full band implementation.

The present invention relates to methods and apparatus for transporting and recovering auxiliary information hidden in a primary data signal having the aforementioned and other advantages.

SUMMARY OF THE INVENTION

A method is provided for hiding auxiliary information in subbands of a primary data signal for communication to a receiver. A pseudorandom noise carrier is modulated by the auxiliary information to provide a spread spectrum signal carrying the information in subbands corresponding to subbands of the primary data signal. The pseudorandom noise carrier may have a flat spectrum, but this is not required when there is a priori knowledge that the spectrum is not flat. The subbands of the primary data signal are evaluated to determine their spectral shape. A carrier portion of the spread spectrum signal is spectrally shaped (i.e., "colored") to simulate the spectral shape of the corresponding subband of the primary data signal. The spread spectrum signal having the spectrally shaped carrier portion is combined with each subband of the primary data signal to produce an output signal carrying the auxiliary information as random noise in the primary data signal.

In an illustrated embodiment, the output signal comprises the sum of the spread spectrum signal and the primary data signal.

A method is provided for recovering the auxiliary information from the output signal, in which the spectral shape of the output signal is determined. The output signal is then processed, based on the determined spectral shape, to flatten (i.e., "whiten") the carrier portion of the spread spectrum signal contained in the output signal, if necessary. The spread spectrum signal is demodulated after the carrier portion has been whitened to despread the spread spectrum signal to recover the auxiliary information.

The step of evaluating the primary data signal to determine the spectral shape of each subband can use time domain modeling, such as LPC. LPC is particularly advantageous because it provides a prediction gain that can be used, for example, to reduce the power of the primary data signal. In such an embodiment, LPC coefficients are provided for use in spectrally shaping the carrier of the spread spectrum signal in each subband. To determine the spectral shape of each subband of the output signal for use in recovering the auxiliary information at a decoder, counterpart LPC coefficients can be independently derived from the spectral shape of the output signal. The counterpart LPC coefficients are used in processing the output signal to whiten the carrier portion. Advantageously, this method eliminates the need to transmit the LPC coefficients to the receiver.

The power of the spread spectrum signal can be adjusted in each subband prior to combining it with the primary data signal. Moreover, power adjustment may occur either before or after the spectral shaping of the spread spectrum signal. The adjustment can be used, for example, to render the spread spectrum signal below a predetermined threshold in the primary data signal. For example, when the primary data signal contain audible components, it may be desirable to make the spread spectrum signal substantially inaudible. This may be achieved by providing the spread spectrum signal at a specific signal-to-noise ratio (SNR) of, for example, −40 dB. Moreover, the allowable SNR may be adjusted to provide an acceptable noise level (e.g., interference level) across the spectrum of the primary data signal. The adjustment can also be used to render the spread spectrum signal at increasingly higher noise levels in an additive fashion, such that the quality of successive copies of a recorded primary data signal will degrade more with each new copy.

It is also possible to hide a plurality of auxiliary information signals in one or more subbands of the primary data signal. To accomplish this, a plurality of pseudorandom noise carriers is modulated by auxiliary information signals to provide a plurality of spread spectrum signals. The carriers, which are spectrally shaped to simulate the spectral shape of the primary data signal, are combined with the primary data signal in the desired subbands(s) to produce the output signal. Each carrier may be individually spectrally shaped prior to its combination with the primary data signal. Or, the carriers may be spectrally shaped as a group prior to combining with the primary data signal. In a hybrid embodiment, some of the carriers can be individually spectrally shaped prior to their combination with the primary data signal, with other carriers being combined as a group before being spectrally shaped and combined with the primary data signal.

To recover the auxiliary information from an output signal in which a plurality of auxiliary information signals is hidden, the spectral shape of subbands of the output signal is determined. The output signal is processed, based on its spectral shape, to whiten the carrier portions of the spread spectrum signals contained therein. A desired spread spectrum signal is demodulated after the carrier portion has been whitened. The spread spectrum signal is despread during demodulation to recover the auxiliary information carried therein.

The pseudorandom noise carrier can be generated cryptographically to provide secure communication of the auxiliary information to a receiver. A secure cryptographic key can be provided at both the transmitter and receiver to generate the pseudorandom noise carrier using a known cryptographic algorithm, such as the data encryption standard (DES). Without the proper key, the particular pseudorandom noise carrier necessary to recover the auxiliary information at the receiver cannot be derived. Other known encryption algorithms, including public and private key schemes, can be used to encrypt the pseudorandom noise carrier.

An apparatus is provided for hiding auxiliary information in subbands of a primary data signal for communication to a receiver. The apparatus includes means for converting a data stream of the auxiliary information into a spread spectrum signal carrying the information. Means are provided for evaluating the subbands of the primary data signal to determine their spectral shape. Means responsive to the evaluating means spectrally shape a carrier portion of the spread spectrum signal to simulate the spectral shape of the subbands of the primary data signal. The spread spectrum signal having the spectrally shaped carrier portion is combined with the primary data signal to produce an output signal carrying the auxiliary information as substantially random noise in the subbands of the primary data signal.

Optionally, means can be provided for adjusting the power of the spread spectrum signal prior to the combining means, to render the spread spectrum signal at a desired level (e.g., below an audible threshold or allowable noise or interference threshold) in the primary data signal. Also optionally, means can be provided for coding the auxiliary information using a forward error correction code before converting the auxiliary information into the spread spectrum signal.

The evaluating means may comprise an LPC processor coupled to receive the primary data signal and generate LPC coefficients therefrom. The means for spectrally shaping the carrier portion comprise an LPC filter responsive to the LPC coefficients.

An apparatus is provided for recovering the auxiliary information from subbands of the output signal that contains the combined primary data signal and spread spectrum signal. This apparatus includes means for determining the spectral shape of the subbands of the output signal. Means are provided for processing the output signal, based on the spectral shape determined by the determining means, to whiten the carrier portion of the spread spectrum signal contained in the output signal. Means are provided for demodulating the spread spectrum signal after the carrier portion has been whitened to obtain and despread the spread spectrum signal and recover the auxiliary information from each subband.

When the spectral shaping is performed using linear predictive coding at the encoder, the decoder can comprise an LPC processor coupled to receive the output signal and generate LPC coefficients therefrom. Advantageously, the LPC coefficients will be derived at the decoder independently of the encoder, so that there is no need to communicate the coefficients from the encoder to the decoder. To whiten the carrier portion of the spread spectrum signal, the decoder can comprise an LPC filter responsive to the locally derived LPC coefficients. The use of such an LPC filter provides the advantageous prediction gain previously mentioned.

A decoder is provided for recovering auxiliary information carried by a spread spectrum signal that is hidden as colored noise in subbands of a primary data signal. The spread spectrum signal includes a carrier having a spectral shape that simulates the spectral shape of the subbands of the primary data signal. Means are provided for determining the spectral shape of the primary data signal. The carrier is processed based on the spectral shape determined by the determining means, to whiten the carrier. Means are provided for demodulating the whitened carrier to recover the spread spectrum signal. The recovered spread spectrum signal is despread, and then demodulated to recover the auxiliary information. The whitening of the carrier in each subband can be accomplished using LPC techniques.

The decoder can be designed to recover a desired one of a plurality of auxiliary information signals carried on respective carriers of the spread spectrum signal. All of the carriers will be spectrally shaped to simulate the spectral shape of the primary data signal. The demodulator means at the decoder will include means for selecting a desired one of the carriers for demodulation to enable the recovery of a corresponding one of the auxiliary information signals. For each information signal, a separate demodulator (and Forward Error-Correcting or FEC decoder, if necessary) is provided. The components for removing the spectral shaping (i.e., the "whitening circuitry") can be shared by all of the auxiliary information signals at the decoder.

The invention also provides a decoder that is implemented using a rake receiver. Such a decoder is particularly useful for decoding signals received from a basic white noise spread spectrum encoder, i.e., an encoder that provides auxiliary information in subbands of a primary data signal as white (uncolored) noise. Whitening means in the decoder create intersymbol interference in the spread spectrum signal. A rake receiver receives the primary data signal from the whitening means. The rake receiver demodulates the received primary data signal to recover the spread spectrum signal with reduced intersymbol interference. The recovered spread spectrum signal is despread to recover the auxiliary information.

The whitening means in the rake receiver embodiment can comprise an LPC processor coupled to receive the primary data signal and generate LPC coefficients therefrom. An LPC filter of order N is provided for receiving the primary data signal. The LPC filter is responsive to the LPC coefficients for whitening the spectrum of the primary data signal. The rake receiver comprises N taps or "fingers", where each finger processes a different multipath of the spread spectrum signal when demodulating the received primary data signal, thereby recovering the spread spectrum signal with reduced intersymbol interference to obtain the auxiliary information therefrom. In this embodiment, the rake receiver can further comprise means responsive to the LPC coefficients for dynamically changing the weights of the rake receiver taps.

BRIEF DESCRIPTION OF THE DRAWINGS

FIG. 5(*b*) is a high level block diagram of a subband LPC encoder providing power adjustment, then spectral shaping of auxiliary information to be hidden in a primary data signal;

FIG. 5(*c*) is a detailed block diagram of the encoder of FIG. 5(*b*);

FIG. 5(*d*) is a block diagram of a power control function for use with the encoders of FIG. 5(*a*)–5(*c*);

FIG. 6(*b*) is a detailed block diagram of the decoder of FIG. 6(*a*);

FIG. 6(*c*) is a high-level block diagram of an alternative embodiment of a decoder for recovering the hidden information output by the encoders of FIGS. 5(*a*)–5(*c*), with PN demodulation in the subband domain;

FIG. 6(*d*) is a detailed block diagram of the decoder of FIG. 6(*c*);

DETAILED DESCRIPTION OF THE INVENTION

Figure 2:
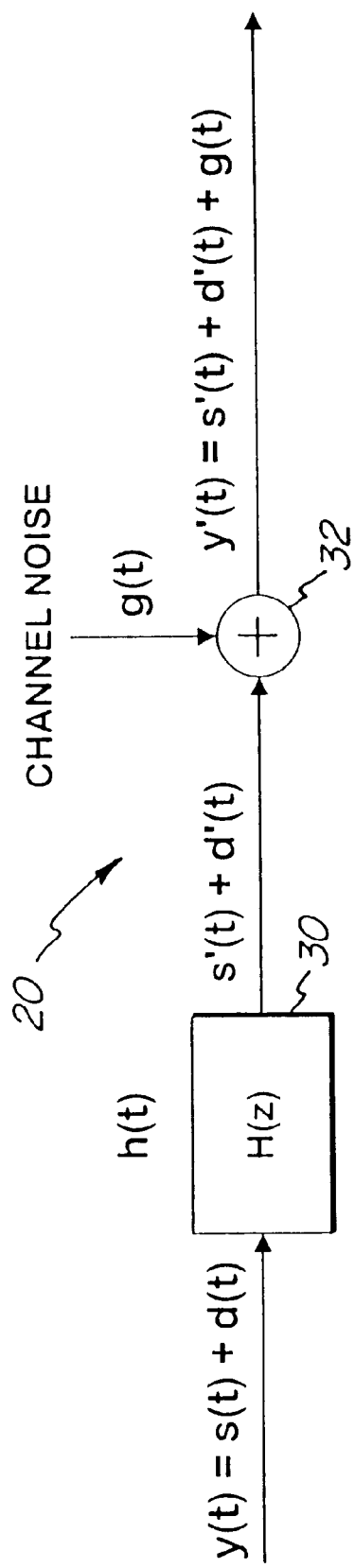
FIG. 2 is a block diagram illustrating a model of a typical transmission channel.

The present invention creates a hidden channel within a physical channel designed to carry a primary data signal without interfering unacceptably with the primary data signal. The subsequent modulation of the primary data signal for transmission is relatively irrelevant. Well known AM, FM, and multilevel modulation techniques such as quadrature phase-shift keying (QPSK), quadrature amplitude modulation (QAM), and other known modulation techniques such as binary phase-shift keying (BPSK), can be used to transmit the primary data signal after processing in accordance with the present invention to carry hidden auxiliary information.

The auxiliary information can comprise any desired data which may or may not have a relationship with the primary data signal. For example, text data, control data, and other unrelated data can be carried in a primary data signal. In addition, or alternatively, data identifying the primary data signal and/or its content, market research and commercial verification data, as well as copy protection data can be carried.

The present invention is not limited in any way as to the type of data that can be hidden or otherwise carried in the primary data signal, nor to the type of primary data signal used. For example, the primary data signal may include an electromagnetic audio signal having frequency components which are below, in, and/or above the audible range. However, the primary data signal is not limited to an audio signal, and may carry any type of information, including video, multimedia, Internet data and the like. The invention may also be extended for use with acoustic waves, including ultrasonic signals.

Preferably, a random noise-like signal is used as the carrier for the auxiliary information to be hidden since random noise is easier to tolerate than correlated noise.

Pseudorandom noise is typically used in a spread spectrum communication system. Such a system is used in accordance with the present invention to reliably transmit data at a desired SNR of, for example, −40 dB. A high processing gain, i.e., ratio between signal bandwidth and signaling rate, is needed to overcome a low SNR. Therefore, in a typical spread spectrum system the information rate is very low, typically over 100 bits per second over a 6 MHz bandwidth video channel. A pseudorandom (PN) carrier used in a spread spectrum system has a wide band spectrum. Thus, the required SNR is difficult to maintain at spectral valleys of the primary data signal unless the processing gain is much higher. To overcome this problem, the PN spectrum is adaptively shaped to the spectrum of the primary data signal. This technique enables auxiliary information to be hidden in a primary data signal at reasonably high data rates.

Adaptive shaping of the PN spectrum in accordance with the present invention to generate a "colored noise" carrier signal can be achieved, for example, by passing white PN noise through an LPC filter derived from the primary data signal. The PN noise sequence serves as the carrier signal that is shaped by an LPC filter to dynamically match the spectrum of the primary data signal. Advantageously, a nearly perfect inverse LPC filter can be computed at a receiver since the injected noise signal itself will have a similar spectral shape as the primary data signal.

A benefit of employing an LPC filter is the flattening or "whitening" effect of the interfering signal, in this case the primary data signal. The linear prediction process removes the predictable part of the signal such that the prediction residual has a relatively flat spectrum. This type of noise significantly improves the performance of FEC coding that can be used for the auxiliary information to reduce the probability of errors at the receiver.

Another benefit of an LPC embodiment is that transmission channel distortion can also be compensated for by the LPC filter through the whitening process. In effect, the inverse LPC filter at the receiver acts as an automatic equalizer for the combined filter formed by the transmit LPC filter and the channel filter. A further benefit of LPC is that it provides a prediction gain useful, for example, in reducing the power of the primary data signal.

In a further embodiment, frequency domain processing (such as subband coding) is used with time domain modeling and synthesis (such as LPC analysis and synthesis). In particular, an auxiliary data signal is divided into corresponding subbands, e.g., by an analysis filter bank, and spectral shaping and/or power adjustment of the auxiliary data samples in each subband is performed. Subsequently, the spectrally shaped and/or power adjusted auxiliary data samples are combined with data samples of the primary data signal in the respective subbands to provide combined subband samples. The combined subband samples are processed by a synthesis filter bank to obtain a combined full band signal that comprises the primary data signal and the auxiliary data signal.

Variations of the encoding scheme are obtained by providing power adjustment before or after spectral shaping.

Compatible decoder structures are also provided for the frequency domain and time domain processing scheme of the present invention. The combined signal is processed by an analysis filter bank to obtain the combined samples in the different subbands. Power adjustment and spectral shaping steps that are the inverse of the steps performed at the encoder are performed. The auxiliary data samples are then recovered from the combined samples. In one embodiment, the auxiliary data samples are recovered from each subband individually. In another embodiment, the auxiliary data samples are recovered from the received combined data signal as a full band signal. The term "full band" is used to designate the entire spectrum of a signal, while the term "subband" is used to designate only a portion of the spectrum of a signal.

Figure 5A:
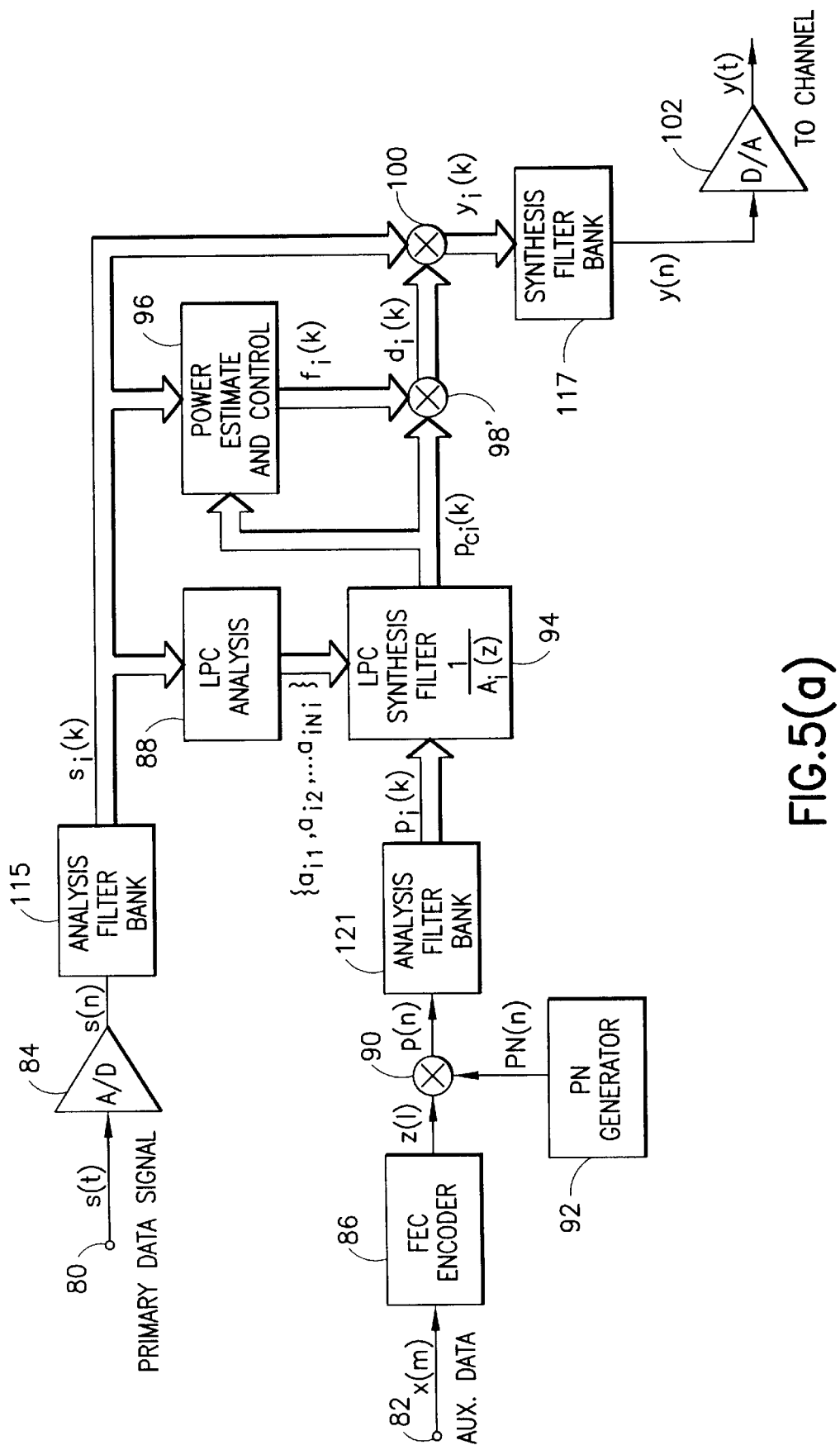
FIG. 5(*a*) is a high level block diagram of a subband LPC encoder providing spectral shaping, then power adjustment of auxiliary information to be hidden in a primary data signal.
Figure 5B:
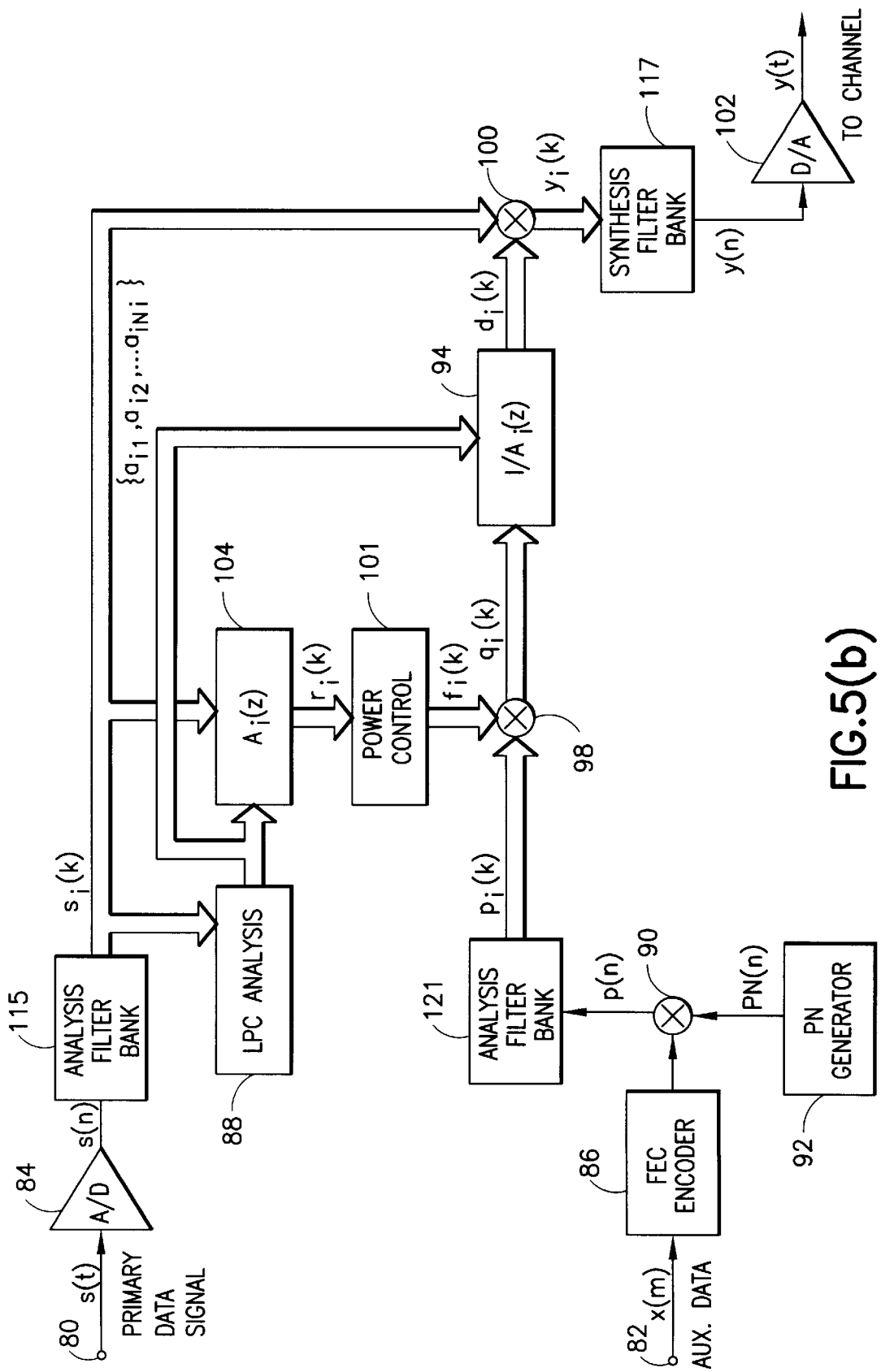
Figures 1, 5C:
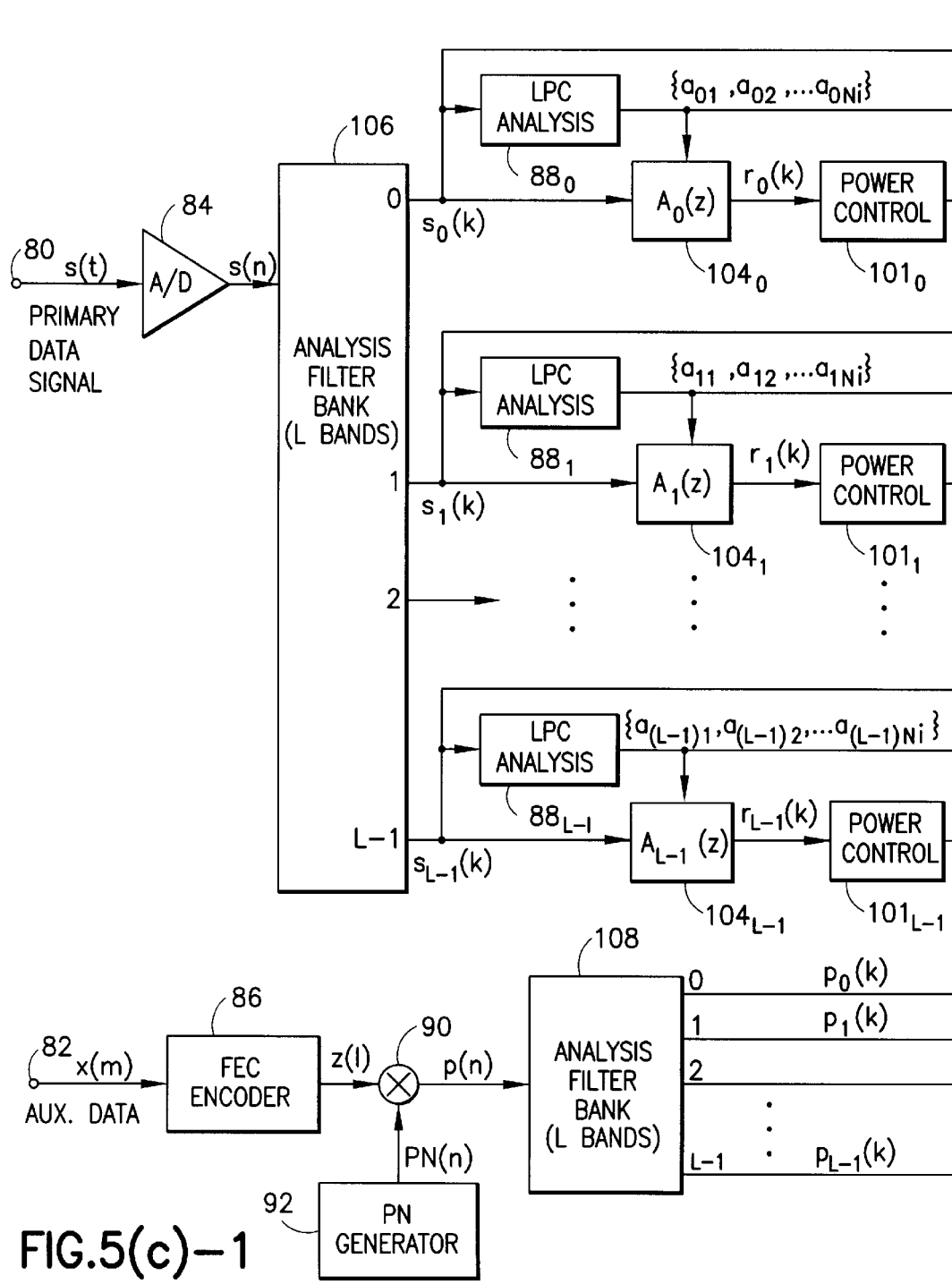
FIG. 1 is a high-level block diagram of the hidden data transport system of the present invention.
Figures 2, 5C:
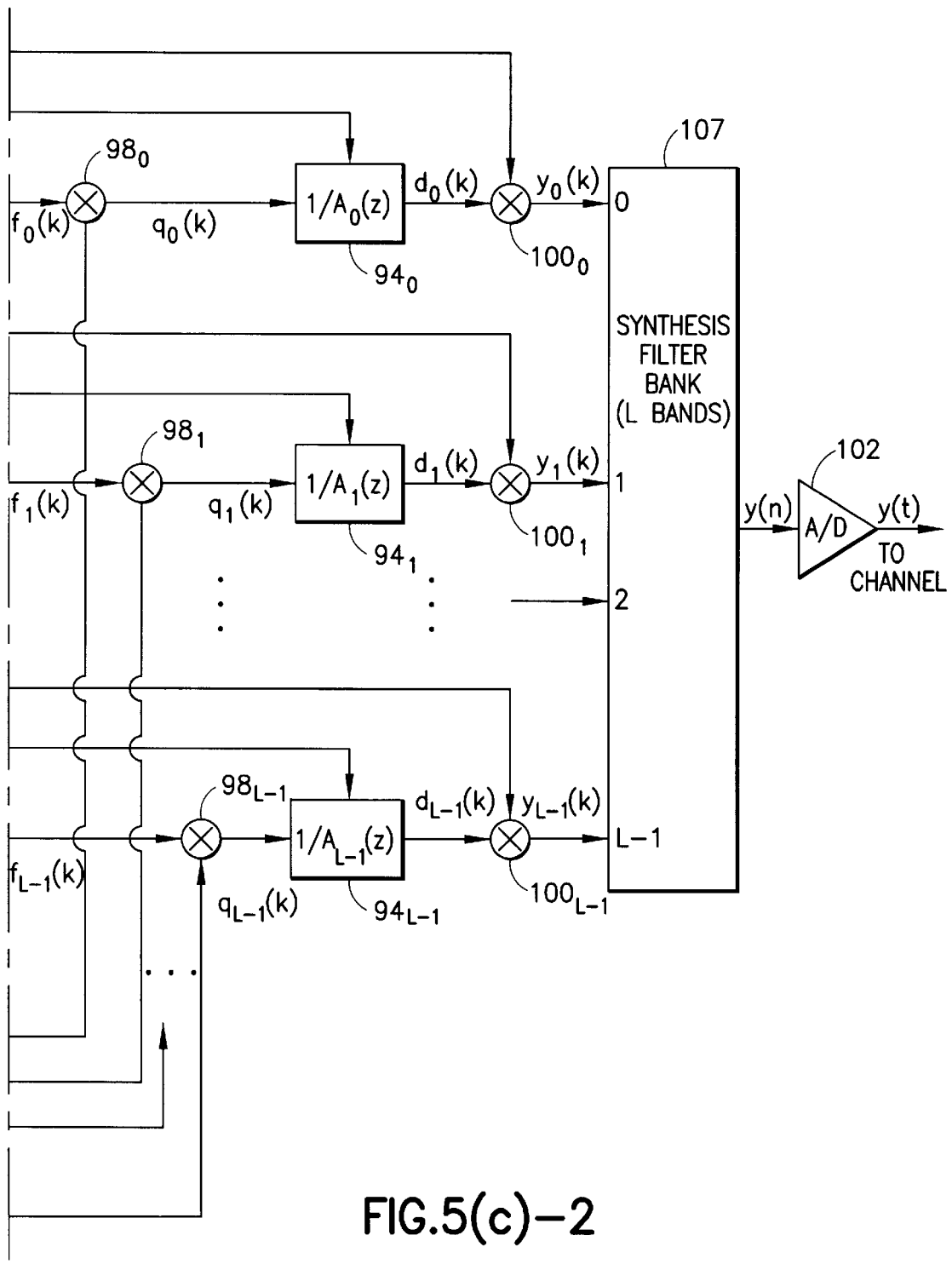

FIG. 1 illustrates the hidden data transport (HDT) system of the present invention in simplified form. A primary data signal is input via terminal 10 to an encoder 14 that includes an HDT encoder 16 and a summing circuit 18. The HDT encoder 16 receives via terminal 12 auxiliary data that is to be hidden in the primary data signal.

The primary data signal s(t) is analyzed by the HDT encoder 16 to determine the spectral shaping requirement. The auxiliary data x(m) input via terminal 12 is modulated to produce a colored noise signal d(t) which is then added to the primary data signal s(t) in summer 18 before transmission. The signal power of d(t) is adjusted to be a small fraction of the power in s(t). The combined signal y(t)=s(t)+d(t) is transmitted via a transmitter 22 over a channel generally designated 20. The transmitter may modulate y(t) onto a carrier such as a sine wave. Moreover, although a wireless channel is illustrated in FIG. 1, a wired channel (e.g., electrically conductive cable or fiber optic cable) can also be used. The invention is also applicable to recorded electromagnetic signals (e.g., on magnetic or optical media or the like, such as tapes and compact discs and the like).

A receiver 24 produces a replica of the transmitted signal, denoted y'(t)=s'(t)+d'(t). The receiver may include a demodulator if y(t) was modulated onto a carrier at a transmitter. Since the primary data signal s'(t) masks the auxiliary data, the auxiliary data d'(t) is hidden and does not interfere with the primary data signal. For example, if the primary data signal includes audio components, users listening to the signal will hear normal audio s'(t) and will not perceive the presence of d'(t).

For non-audio components in the primary data signal, a threshold level of acceptable interference may be determined for the specific application and defined by a signal-to-noise ratio, for example. This threshold level may be determined based on qualitative and/or quantitative criteria. For example, for a satellite transmission, an acceptable interference level may be measured according to a signal acquisition time or error rate. For an analog television transmission, an acceptable interference level may be measured according to the video image quality. HDT decoder 26 will recover the auxiliary digital signal x(m) as x'(m) from the received signal y'(t).

Transmitter 22, receiver 24 and the propagation medium through which they communicate are collectively referred to as the channel 20. This channel can be virtually anything capable of carrying or storing a primary data signal, using any form of analog or digital transmission including, for example, AM or FM broadcasting, satellite transmission, cellular phone and other mobile radio transmissions, cable television, cassette tape, compact disc, the Internet, computer networks, telephone networks and the like. Furthermore, the transmission may be in a compressed or uncompressed format.

FIG. 2 is a model of the transmission channel 20. The channel is simply modeled in this example by a linear channel filter 30 (H(z)), with an additive noise g(t) referred to as "channel noise." Here, the channel noise is added to the output of the linear channel filter 30 via an adder 32. The channel may alternatively be non-linear.

The channel filter H(z) is expected to have a nominal low pass characteristic with a sufficiently wide bandwidth to pass the primary data signal with a good quality. The output of the transmission channel is y'(t)=s'(t)+d'(t)+g(t). The components s'(t) and d'(t) are the responses of the channel to the input s(t) and d(t), respectively.

Figure 3:
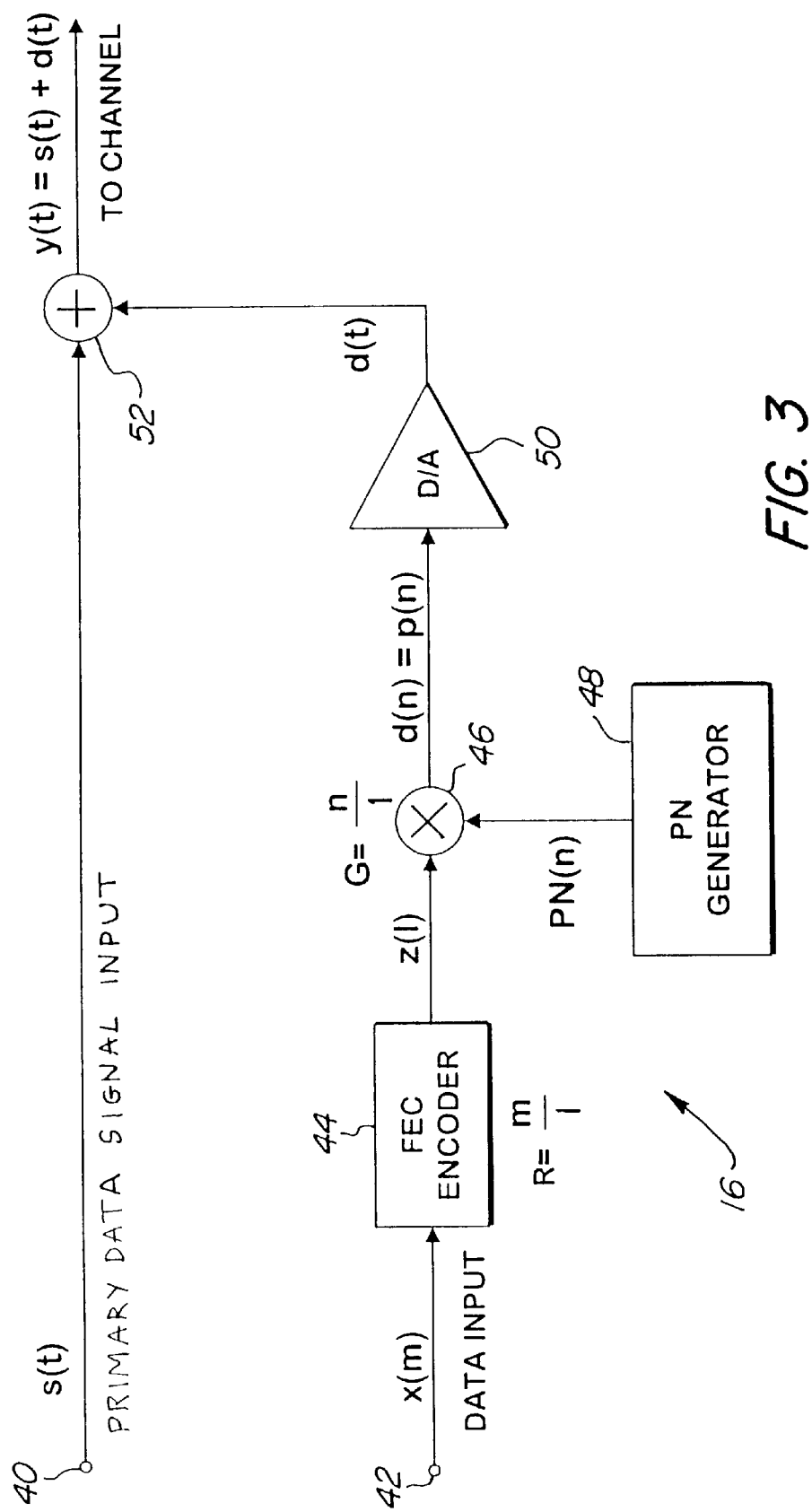
FIG. 3 is a block diagram of a basic white noise hidden data transport encoder.

FIG. 3 illustrates a white noise HDT encoder that allows auxiliary information to be carried on a primary data signal as uncolored noise (i.e., without spectral shaping of the spread spectrum carrier). The use of uncolored noise to carry the auxiliary information provides a lower performance than can be obtained using colored noise, as described in more detail below in connection with FIGS. 5(a) and 6. However, the encoder 16 provides an efficient implementation.

The encoder 16 receives the primary data signal input s(t) via terminal 40. This input is added to the auxiliary information, which is in the form of a spread spectrum signal, via a summing circuit 52. The primary data signal input can be combined with the spread spectrum signal carrying the auxiliary information using any known signal combining circuit.

The auxiliary information is input via terminal 42 to an FEC encoder 44, as known in the art. The FEC encoded data is then multiplied with a pseudorandom noise sequence output from a conventional pseudorandom sequence generator 48 via a multiplier 46. The PN generator 48 can be based, for example, on a feedback shift register circuit or other well known key and generator circuit. The output of the generator PN(n) may, for example, take on values of either +1 or −1. In this example, the long-term power spectrum of PN(n) is flat (i.e., "white"), although the present invention may be adapted for use when PN(n) is not flat.

The output of multiplier 46 is a modulated PN sequence, p(n). Normally, the sampling rate or "chip rate" of PN(n) is much higher than the symbol rate of the output z(l) of FEC encoder 44. Thus, G>>1, where G=n/l is the processing gain ("spreading ratio"). The signal processing from x(m) to p(n) illustrated in FIG. 3 comprises conventional direct sequence spread spectrum modulation.

Figure 4:
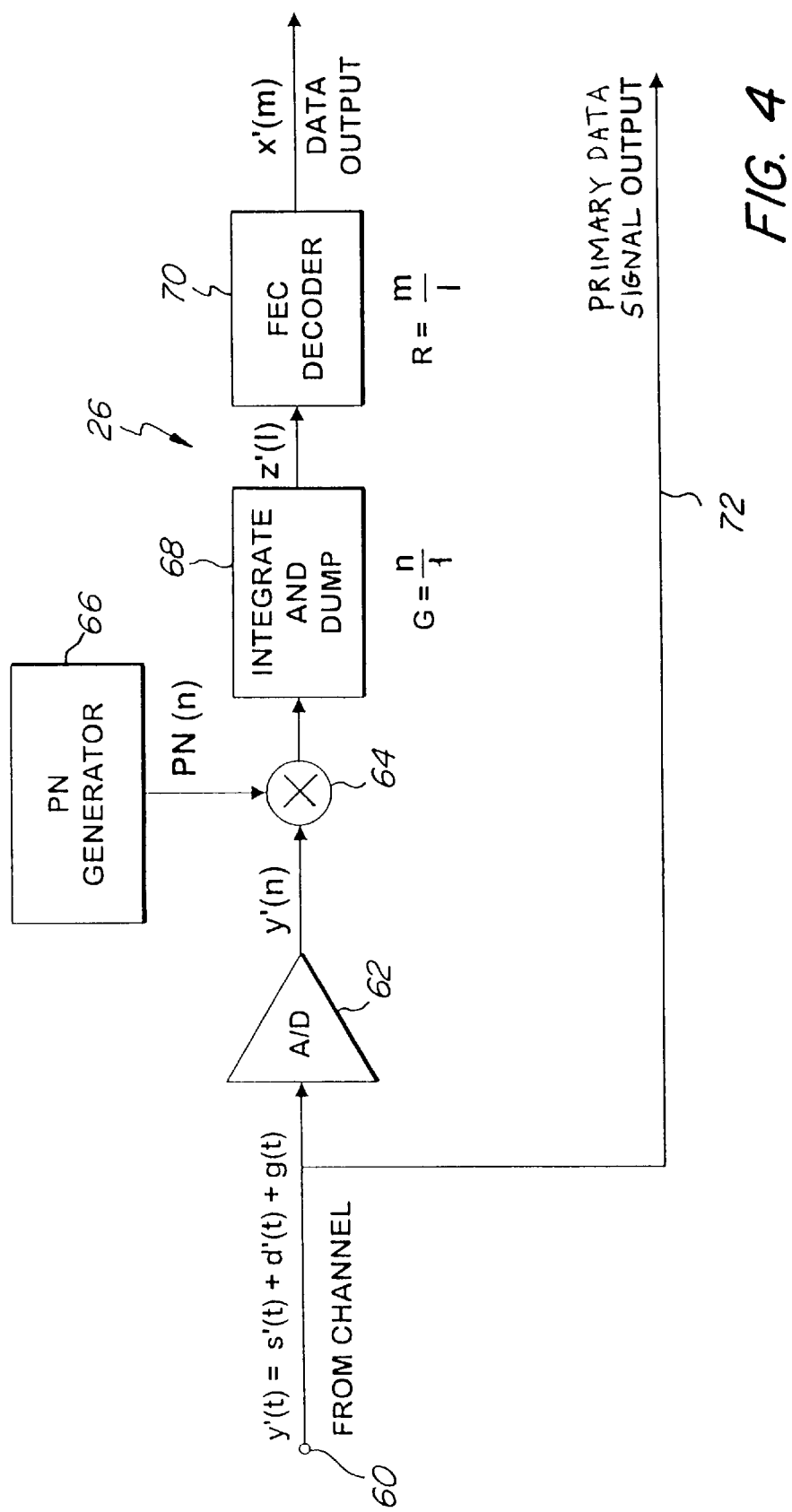
FIG. 4 is a block diagram of a basic white noise hidden data transport decoder.

The modulated PN sequence, p(n), is input to a digital-to-analog (D/A) converter 50, that converts the signal to its analog form d(t) for combination with the primary data signal, which is then communicated over a channel to the decoder of FIG. 4.

FIG. 4 illustrates a decoder wherein the primary data signal carrying the auxiliary information is input via a terminal 60 to an analog-to-digital (A/D) converter 62. The primary data signal is also directly output via line 72 to conventional processing circuitry which may include a demodulator, filter, amplifier, and the like (not shown). The noise containing the auxiliary information is at a level in the output primary data signal which is low enough to avoid interfering with the primary data signal. Thus, the auxiliary information is "hidden", or imperceptible, in the primary data signal; it is there, but it will not interfere with conventional processing of the primary data signal. For instance, if the primary data signal includes audio components, the auxiliary information may be provided at a substantially inaudible level. Similarly, if the primary data signal includes video components, the auxiliary information may be provided at a substantially invisible level.

The A/D converter 62 digitizes the input signal for combination in multiplier 64 with the same pseudorandom sequence PN(n) used at the encoder. The pseudorandom sequence is provided by a PN sequence generator 66, which is the same as the PN sequence generator 48 found at the encoder. The multiplication performed by circuit 64 demodulates the spread spectrum signal, which is then despread in a conventional manner by integration and dumping circuit 68. The despread output z'(l) comprises the FEC encoded auxiliary information. This information is decoded by FEC decoder 70 to output the recovered auxiliary information x'(m).

The amount of noise that can be added to the primary data signal without exceeding an interference threshold can be increased by using a colored noise signal instead of the white noise signal provided by the encoder of FIG. 3.

FIG. 5(a) is a high level block diagram of a colored noise encoder using subband LPC and providing spectral shaping, then power adjustment of the auxiliary information to be hidden in the primary data signal. This encoder is referred to as SBLPC (subband LPC) encoder, as opposed to a FBLPC (full band LPC) encoder, in which processing occurs in a single band. In many cases, subband LPC can provide a more faithful modeling of the primary audio signal with lower computational requirements.

The computational savings of SBLPC are significant for moderate to high LPC orders, which is the case when good spectral modeling is necessary. For example, SBLPC is well suited for spectrally modeling a primary data signal comprising music or other audio with many tonal components in its spectrum. To achieve the same spectral modeling performance of FBLPC with a model order of 256, for example, SBLPC needs only a model order of 8 in each of 32 subbands, e.g., 256/32=8. However, at such a high FBLPC order, Durbin's recursion dominates the computation (e.g., 256×256=65,536 computations for FBLPC compared to only 8×8=64 computations for each of the 32 subbands for SBLPC). In this example, SBLPC is 32 times faster than FBLPC.

Furthermore, the autocorrelation and filtering processes used in prediction and synthesis also benefit by the linear ratio of the full band model order to the subband model order, e.g., 256/32=8. While the filter bank computation for SBLPC requires significant overhead computations, fast filter bank algorithms exist to meet this requirement.

Another advantage of SBLPC is improved modeling of deep spectral valleys and spectral floors of the primary data signal since each subband is treated independently.

Yet another advantage of SBLPC is that many of the encoding parameters, including the power control time constant and the LPC order, can be optimized for each subband.

The illustrated encoder analyzes the primary data signal information in the digital domain to determine its spectrum, colors the auxiliary data with the same spectrum, and combines the audio data with the colored auxiliary data digitally before the combined signal is converted back to the analog domain. However, this implementation is merely an example of a preferred embodiment. The processing can be accomplished in either the digital or analog domain, and the signals can be transported as digital or analog signals depending on the particular requirements of the system using the invention. Thus, the provision of A/D and D/A converters in FIGS. 5(a)–5(c) and 6(a)–6(d) is not meant to suggest that the processing must take place as shown.

Again referring to FIG. 5(a), the primary data signal is input to the encoder via terminal 80. An A/D converter 84 converts the analog primary data signal to a digital form s(n). The digital signal s(n) is then processed by an L-band analysis filter bank 115 to provide the data samples $s_i(k)$ in each ith subband, and provided to an LPC analysis function 88, power estimate and control function 96, and adder 100.

Each subband signal $s_i(k)$ represents the designated portion of the frequency band of the input signal s(n). Furthermore, the subband signal can be sub-sampled in time since it represents a limited bandwidth signal. In a critically sampled filter bank, such as an MPEG filter bank or Time Domain Aliasing Cancellation (TDAC) filter bank, as used in the Dolby® AC-3 audio compression standard, the sub-sampling ratio is the same as the number of subbands. For example, if there are 32 subbands, each subband signal is subsampled by 32, so the computational rate drops by 32 for that subband, although there are now 32 such subbands to process. Even if the LPC order N is the same for each subband, and the total amount of computation does not change, the effective LPC order (full band equivalent) now has advantageously increased to 32×N.

The auxiliary data x(m) to be transported with the primary data signal s(t) is input to an FEC encoder 86 via terminal 82 for data integrity thereby generating coded symbol z(l). Note that a BPSK modulator is assumed to be part of the FEC encoder 86. The bits output from the FEC encoder are therefore also symbols. However, modulation schemes other than BPSK may be used. The ratio between the number of information bits and the number of coded symbols is R =m/l, where the "m" represents the sampling rate for x(m), and "l" is the sampling rate of z(l). Elsewhere, when used with parentheses, m and l are sampling indexes for x(m) and z(l), respectively.

PN sequence generator 92 supplies the PN carrier PN(n) which, for example, can take on values of either +1 or −1. PN(n) has a white, long-term power spectrum. PN(n) is multiplied with z(l) in a multiplier 90 to generate the modulated PN sequence p(n), which is provided to an L-band analysis filter bank 121 corresponding to the filter bank 115. Alternatively, a single analysis filter bank may be used on a time-sharing basis for s(n) and p(n).

In each subband, the flat spectrum of the PN modulated signal $p_i(k)$ undergoes spectral shaping in an LPC synthesis filter 94 according to the LPC coefficients $\{a_{i1}, a_{i2}, \ldots, a_{1N_i}\}$ and model order $N_i$ of each ith subband. The model order may be varied in each subband to provide optimal results. Alternatively, the same model order may be used for each subband. The optimal model order in each subband can be determined based on a trade off between computational complexity and accuracy of the spectral modeling. Spectral shaping is applied by passing the PN modulated signal through an L-band filter 94, where each ith subband, i=1, ..., L, has the response $1/A_i(z)$, where $$A_i(z)=1-(a_{i1}z^{-1}+a_{i2}z^{-2}+ \ldots +a_{iN_i}z^{-N_i})$$

and the $a_{ij}$'s are the coefficients of an $N_i$ order LPC filter for each subband.

The coefficients of the LPC filter used for the spectral shaping conform to coefficients derived from each subband of the primary data signal by an LPC analysis circuit 88. The LPC analysis can employ any known method for analyzing a signal spectrum, such as the Levinson-Durbin recursion.

The order $N_i$ for the LPC analysis in each ith subband is made as large as necessary to accurately model the spectrum of the primary data signal. For example, an order of between about 5 and 50 should be adequate for the LPC analysis. However, the order $N_i$ may depend on the bandwidth of the signal. Thus, for example, for typical telephone bandwidths, $N_i$ may be about ten. The LPC filter coefficients are updated as often as necessary to track the frequency and amplitude variations of the primary data signal. Furthermore, the number of subbands can be varied. L=32, for example, provides adequate performance.

The output of LPC synthesis filter 94 is a modulated colored noise sequence $p_{ci}(k)$ in each ith subband. The noise power is adjusted in each subband via a power estimating and control circuit 96 and multiplier 98 to a desired level. For example, where it is desired to have the auxiliary information carried on the primary data signal within a specific noise power, the noise power is adjusted to fall below the specified level.

In other applications, it may be desired to set the noise power above an interference threshold level which does not interfere with the primary data signal. For example, in a copy protection scheme for an audio storage medium (e.g., digital audio tapes or DAT, or compact disc), it may be desired to add a noise signal to the digital audio in the primary data signal each time a copy is made. After a given number of copies, the cumulative noise will audibly degrade the quality of the recording. Alternatively, it may be desired to introduce a predetermined amount of interference to a primary data signal. In this case, the power estimation and control circuitry 96 will be adjusted to introduce the desired amount of noise (which may be above the interference threshold) to each subband of the primary data signal.

For each pseudorandom frame output from the filter 94, the average power in each subband of the primary data signal $s_i(k)$ and the average power in $p_{ci}(k)$ are measured by the power estimate and control circuit 96. A proper scaling signal $f_i(k)$ for each ith subband is applied to the corresponding $p_{ci}(k)$ via multiplier 98 to maintain the output signal power $d_i(k)$ at the desired power level in each subband, such as below an interference threshold. To render the auxiliary information below an interference threshold, the ratio of the auxiliary information to the primary data signal information is typically 1:1,000 in power (−30 dB) in an audio application. The power adjusted colored PN noise signal $d_i(k)$ is added to the corresponding primary data signal $s_i(k)$ via adder 100 to produce combined output signals $y_i(k)$ for each ith subband. The output subband signals $y_i(k)$ are assembled at an L-band synthesis filter bank 117 to provide the full band combined samples $y(n)$, which can be converted to an analog signal $y(t)$ via a D/A converter 102, for transmission or storage in place of the primary data signal $s(t)$.

Alternatively, in the embodiments of FIGS. 5(a)–5(c), the primary signal $s(n)$ can be added to $y(n)$ directly rather than being added in the subband domain via adders $100_0$, $100_1, \ldots, 100_{L-1}$.

Note that different frequency decomposition techniques may be used in place of the analysis filter banks 115, 121, while different synthesis techniques can be used in place of the synthesis filter bank 117. For example, band-pass filter banks, critically sampled subband filter banks such as the cosine modulated filter bank used in the MPEG standard, or TDAC use in the AC-3 or Advanced Audio Codec (AAC) standards), windowed FFT, etc. are all good candidates. The LPC techniques disclosed herein can also be generalized to any time domain modeling that requires adaptive parameter estimation, or even a cascade of modeling operations.

Generally, a subband analysis filter bank receives a full band input signal and splits or decomposes the signal into multiple frequency bands. Each band has a narrower bandwidth than the full band input signal. The bandwidths of each subband may be the same or different. Moreover, each band may have a lower sampling rate than the full band input signal. A subband synthesis filter bank receives the signals from each of the separate subbands and combines them to recover a full band signal corresponding to the full band of the input signal.

By passing the modulated PN sequence $p(n)$ through the same analysis filter bank as used for the primary data signal, compatibility is provided between a full band LPC encoder and a subband LPC encoder. That is, the primary and auxiliary data signals can be encoded or decoded with any combination of full band and subband processing. If this compatibility is not required, the PN sequence $p(n)$ can be generated and modulated in the subband domain. For example, the embodiment of FIG. 5(a) can be modified by providing the multiplier 90 as a plurality of L multipliers between the analysis filter bank 121 and the LPC synthesis filter 94. Each multiplier would receive a corresponding subband PN sequence from the PN generator 92.

FIG. 5(b) is a high level block diagram of a colored noise HDT encoder using subband LPC and providing power adjustment, then spectral shaping of the auxiliary information. The encoder is particularly adapted for use with a primary audio signal, but may be used with other types of data as well. Here, $p_i(k)$ is power-adjusted in each ith subband before being spectrally shaped. The LPC analysis circuit 88 provides coefficients $\{a_{i1}, a_{i2}, \ldots, a_{iN_i}\}$ to an LPC prediction filter 104 and the LPC synthesis filter 94. The LPC prediction filter 104 implements the transform function $A_i(z)$ for each ith subband, which is essentially the inverse of the spectrum of $s_i(k)$. The filtered primary data signal input (designated $r_i(k)$), which has the transfer function $S_i(z)A_i(z)$, where $S_i(z)$ is the z-transform of $s_i(k)$, is then provided to a power control function 101.

Figure 5D:
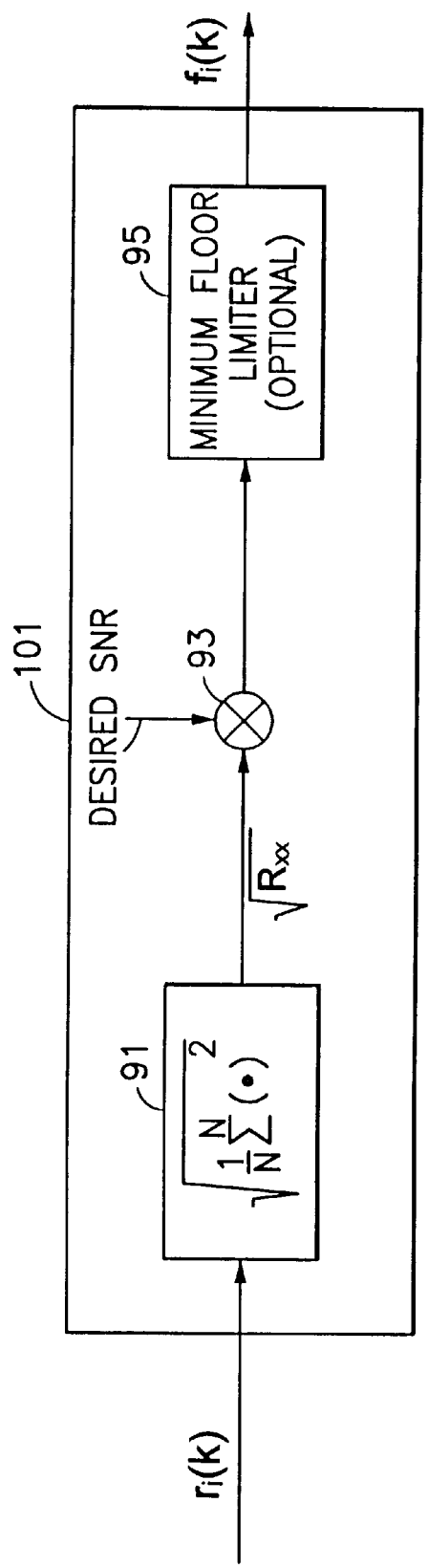

FIG. 5(d) is a block diagram of a power control function for use with the encoders of FIGS. 5(a)–5(c). The power control function 101 includes an average amplitude estimation function 91, a multiplier 93, and a limiter 95. The average amplitude estimation function 91 receives the filtered primary data signal input (e.g., subband prediction residual) $r_i(k)$ and estimates the average amplitude in each subband, in particular, by determining the root mean square of the amplitude of $r_i(k)$ as follows, where $NS_i$ is the number of samples in the ith subband, and the summation is over the $NS_i$ samples:

$$\left[\frac{1}{NS_i}\sum (r_i(k))^2\right]^{\frac{1}{2}}.$$

Other techniques for estimating power may also be used. The estimated average amplitude is then multiplied by a SNR value at multiplier 93 to provide an amplitude adjustment signal $f_i(k)$ for the ith subband. The SNR is a desired ratio of the auxiliary information to the primary data signal information (e.g., −30 dB). The amplitude adjustment signal is provided to an optional limiter function 95 which limits the adjustment signal to a minimum floor value. By limiting the adjustment signal to a minimum, non-zero, floor level, it is possible to encode HDT data through silent portions of a primary audio data signal.

Referring again to FIG. 5(b), the amplitude adjustment signal $f_i(k)$ is combined with the auxiliary data signal $p_i(k)$ at a multiplier 98 to provide a power-adjusted auxiliary data signal $q_i(k)$ in each subband to the LPC synthesis filter 94 for spectral shaping in accordance with the LPC coefficients $\{a_{i1}, a_{i2}, \ldots, a_{iN_i}\}$ in each subband.

Finally, the power-adjusted and spectrally shaped PN noise signal $d_i(k)$ is added to the primary data signal $s_i(k)$ in each corresponding subband via adder 100 to produce the combined output signal $y_i(k)$. The combined output signal $y_i(k)$ is processed by an L-band synthesis filter bank 117 to obtain the full band combined signal $y(n)$, which may be further processed by the D/A converter 102 as discussed.

FIG. 5(c) is a detailed block diagram of the encoder of FIG. 5(b). Here, the individual signals in each subband are shown. For example, primary data signal samples in each subband, $s_0(k), s_1(k), \ldots, s_{L-1}(k)$ are output from the analysis filter bank 106 and provided to corresponding LPC analysis functions $88_0, 88_1, \ldots, 88_{L-1}$ and LPC prediction filters $104_0, 104_1, \ldots, 104_{L-1}$, respectively. The subbands are numbered from 0 to L−1.

The subband signal sequences $s_0(k)$ through $S_{L-1}(k)$ may have a different sampling rate than the primary signal $s(n)$. When the analysis filter bank 106 is a critically sampled filter bank, the sampling rate of the subband signal sequence is L times lower than that of the primary signal, thus preserving the total number of samples going in and out of the filter bank. Advantageously, lowering the sampling rate of the subband signal sequence lowers the computational processing needs within each subband.

The LPC analysis functions $88_0, 88_1, \ldots, 88_{L-1}$ calculate respective sets of LPC filter coefficients $\{a_{01}, a_{02}, \ldots, a_{0N_0}\}$ $\{a_{11}, a_{12}, \ldots, a_{1N_1}\}, \ldots, \{a_{(L-1)1}, a_{(L-1)2}, \ldots, a_{(L-1)N_{L-1}}\}$ which are provided to the respective prediction filters $104_0, 104_1, \ldots, 104_{L-1}$, and LPC synthesis filters $94_0, 94_1, \ldots, 94^{L-1}$.

The prediction filters $104_0, 104_1, \ldots, 104_{L-1}$ provide respective filtered primary data signal samples (e.g., subband prediction residuals) $r_0(k), r_1(k), \ldots, r_{L-1}(k)$ to respective power control functions $101_0, 101_1, \ldots, 101_{L-1}$, which in turn provide respective amplitude adjustment signals $f_0(k), f_1(k), \ldots, f_{L-1}(k)$ to respective multipliers $98_0, 98_1, \ldots, 98_{L-1}$. At the multipliers, the respective amplitude adjustment signals are multiplied with the corresponding modulated colored noise sequences $p_0(k), p_1(k), \ldots, P_{L-1}(k)$ to provide the corresponding power-adjusted subband auxiliary data signals $q_0(k), q_1(k), \ldots, q_{L-1}(k)$, to the corresponding synthesis filters.

The power control functions $101_0$, $101_1$, $101_{L-1}$, measure the average RMS (root mean square) power in $r_0(k)$, $r_1(k), \ldots, r_{L-1}(k)$ to produce the corresponding subband amplitude adjustment signals $f_0(k), f_1(k), \ldots, f_{L-1}(k)$, which represent the average amplitudes of $r_0(k), r_1(k), \ldots, r_{L-1}(k)$, respectively, over a short time period.

At the synthesis filters, the power-adjusted auxiliary data signals are filtered to provide corresponding power adjusted and spectrally shaped PN noise signals $d_0(k), d_1(k), \ldots, d_{L-1}(k)$ to corresponding adders $100_0, 100_1, \ldots, 100_{L-1}$, which in turn provide corresponding combined output signals $y_0(k), y_1(k), Y_{L-1}(k)$ to the L-band synthesis filter bank 117. The PN noise signals $d_0(k), d_1(k), \ldots, d_{L-1}(k)$ acquire the fine spectral shaping that was present in the subband signal sequences $s_0(k), s_1(k), \ldots, S_{L-1}(k)$.

Note that the different processing components in each subband can be implemented using shared or independent hardware, firmware, and/or software.

Advantageously, the embodiments of FIGS. 5(b) and 5(c) are matched to the processing performed at a decoder of the present invention. Moreover, by performing the power adjustment prior to spectral shaping, the auxiliary data signal may be smoother since transitions between frames of data samples will be reduced.

A hypothetical, but practical, audio design example implementing the encoder of FIGS. 5(a)–5(c) can utilize an input data rate of 7.5 bits per second (m=7.5 Hz) for the auxiliary information input via terminal 82. The FEC encoder rate can be R=½ (l=15 Hz), and the processing gain (spread ratio) may be G=2,000 (33 dB). The pseudorandom sampling rate (chip frequency) is n =30 KHz. The LPC prediction order in each ith subband is $N_i$=10, with L=32 subbands. The equivalent full band LPC order is therefore 320, indicating a high modeling accuracy, but the computational requirements are significantly reduced since a model order of only ten is used in each subband. It is assumed that the channel has at least 15 KHz of bandwidth with minor frequency distortions.

The encoder may use BPSK, with x(m), z(l), PN(n), and p(n) as binary signals, x(m)={0, 1}, z(l)={−1, +1}, PN(n)= {−1, +1}, and p(n)={−1, +1}. The FEC encoder generates two samples of z(l) for every input sample of x(m). They may not be adjacent samples since an interleaver may be employed inside the FEC encoder. A PN frame is defined as a group of, e.g., 2000 PN chips (samples) of PN(n). For each sample of z(l), 2000 chips of PN(n) in the PN frame are multiplied with z(l). That is, the signs of 2000 samples in the PN frame are changed if z(l)=−1. The resulting BPSK modulated PN signal, p(n), has a white noise spectrum. The desired spectral shaping is obtained by passing $p_i(k)$ through $1/A_i(z)$ to produce $p_i(k)$ in the encoder of FIG. 5(a), or by passing $q_i(k)$ through $1/A_i(z)$ to produce $d_i(k)$ in the encoder of FIGS. 5(b) and 5(c).

Although the primary data signal in the above design example is stronger than the noise signal (e.g., by 30 dB), the processing gain is very high. With R=½ and G=2,000, the effective processing gain is 4,000 (36 dB). The available bit energy over noise density (Eb/No) is 36−30=6 dB, which is very adequate for BPSK signaling.

The specific parameters noted in the above example are for purposes of illustration only. Other parameters may be used in a particular implementation, as will be appreciated by those skilled in the art.

Figure 6A:
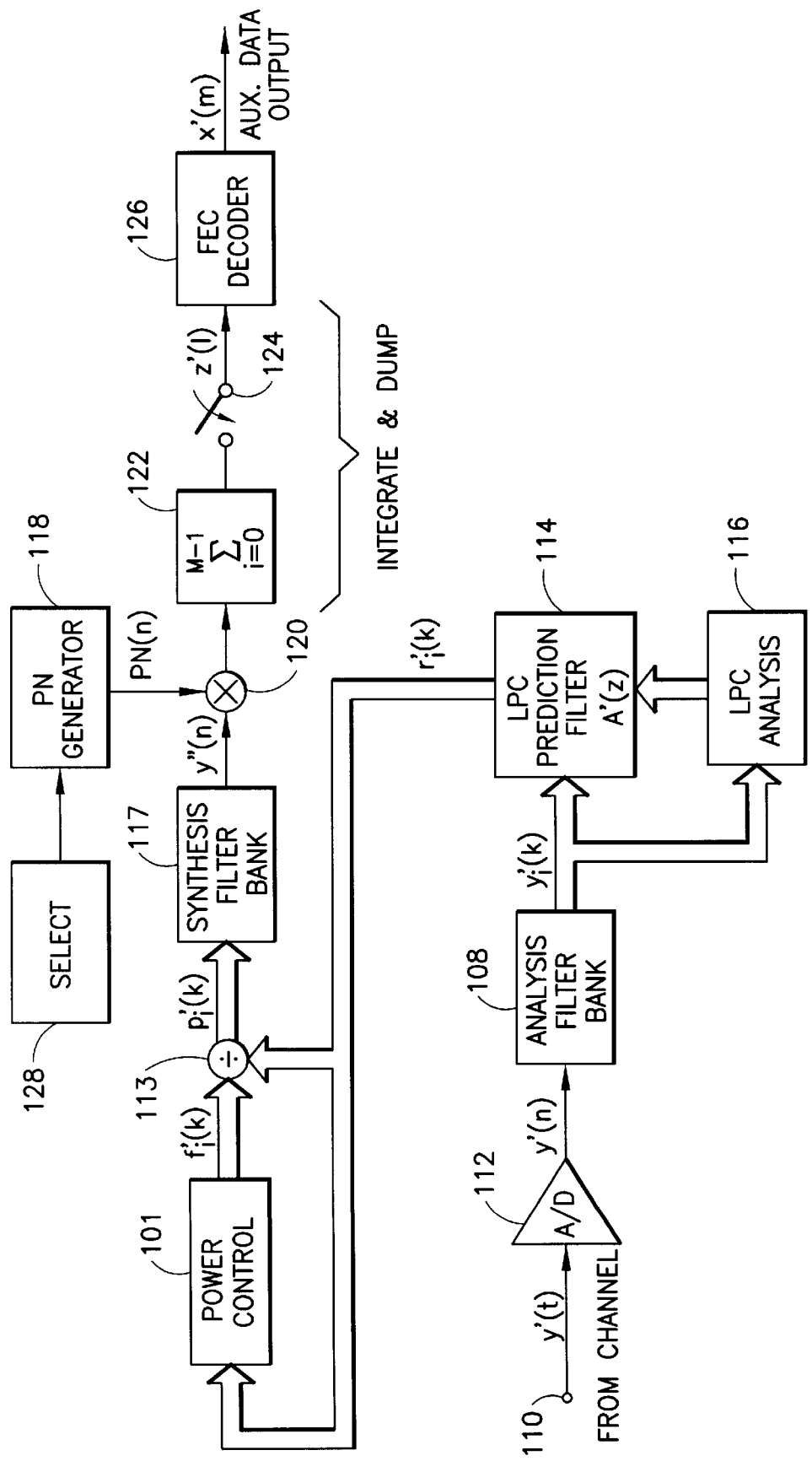
FIG. 6(*a*) is a high-level block diagram of a decoder for recovering the hidden information output by the encoders of FIGS. 5(*a*)–5(*c*), with PN demodulation in the full band domain.

FIG. 6(a) is a high-level block diagram of a decoder for recovering the hidden information output by the encoders of FIGS. 5(a)–5(c), with PN demodulation in the full band domain The decoder is a subband LPC decoder where spectral deshaping is accomplished by a combination of frequency domain decomposition and time domain modeling that closely matches the subband LPC encoder of FIGS. 5(b) and 5(c), but can be used with any of the encoders of FIGS. 5(a)–5(c).

The received signal y'(t) is received at a terminal 110 and converted to a digital signal y'(n) at an A/D converter 112. From y'(n), the analysis filter bank 108 produces subband signal sequences y'i(k) for each ith subband. For each subband, LPC analysis function 116 estimates the LPC coefficients used at the encoder. The resulting LPC coefficients $\{a'_{i1}, a'_{i2}, \ldots, a'_{iN_i}\}$ are provided to the LPC prediction filter 114, which filters $y'_i(k)$ to produce the subband prediction residuals $r'_i(k)$. This residual, $r'_i(k)$, closely approximates the subband prediction residual $r_i(k)$ at the encoder.

The power control function 101 computes the average RMS power in the subband prediction residual $r'_i(k)$ as discussed in connection with function 91 of FIG. 5(d), and provides the subband power control value (e.g., amplitude adjustment signal) $f'_i(k)$ for each subband to a divider 113. The divider 113 normalizes the average power in $r'_i(k)$ to produce power-normalized (e.g., amplitude adjusted) subband prediction residual values, $p'_i(k)$, which are provided to the synthesis filter bank 117. The synthesis filter bank 117 merges $r'_i(k)$ into a full band prediction residual y" (n).

The select block 128 provides addressing information to the PN generator 118 which in turn provides a PN sequence PN(n) that is correlated with the prediction residual y"(n) at a multiplier 120. The correlation result is provided to an integration and dump circuitry formed by a summer 122 (with i as a dummy index) and a switch 124. An integration result of every M correlation samples is provided to the FEC decoder 126, which decodes the auxiliary data signal x'(m) from the estimated symbols z'(l). M is the length (e.g., number of samples) of the symbol.

Figures 1, 6B:
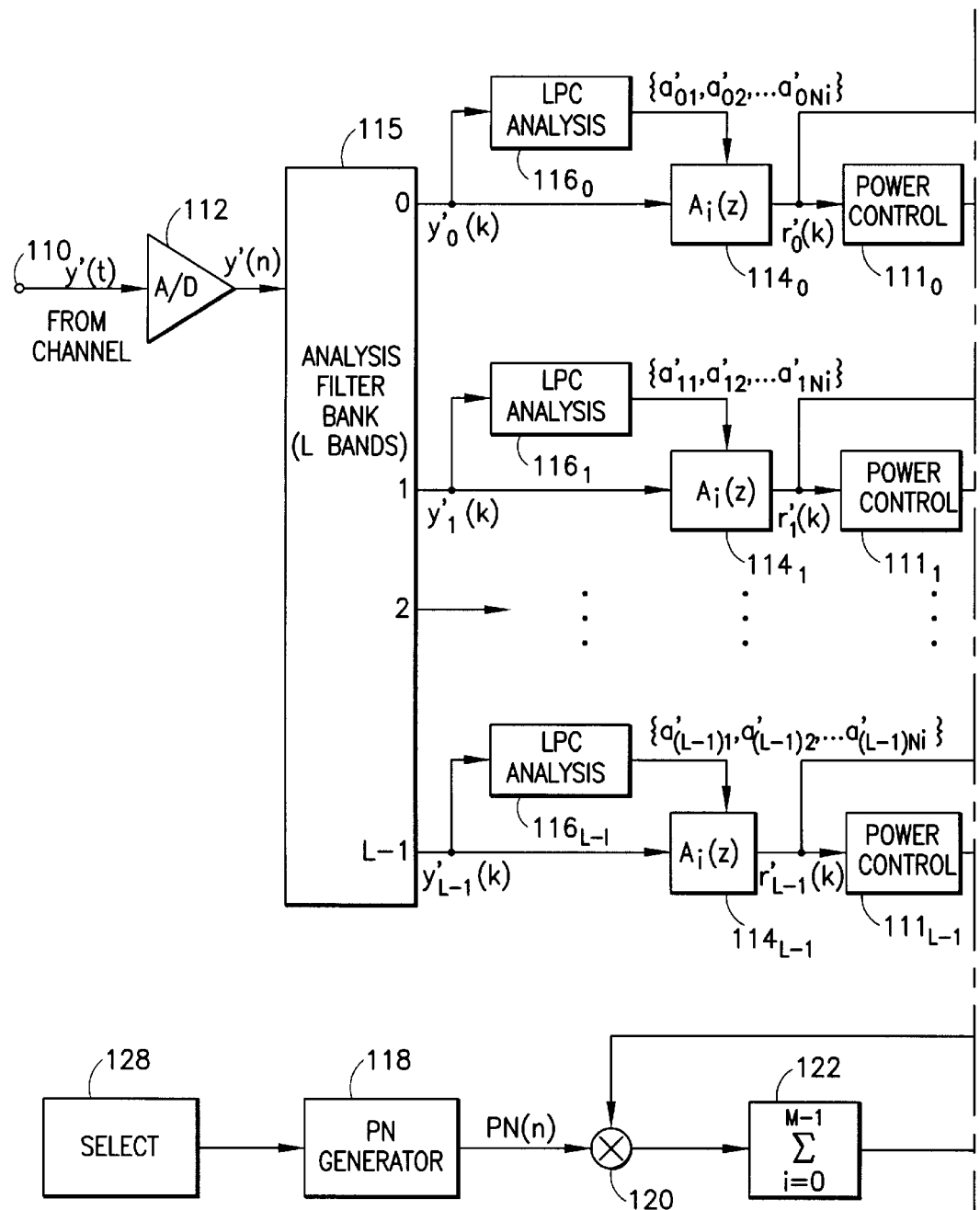
Figures 2, 6B:
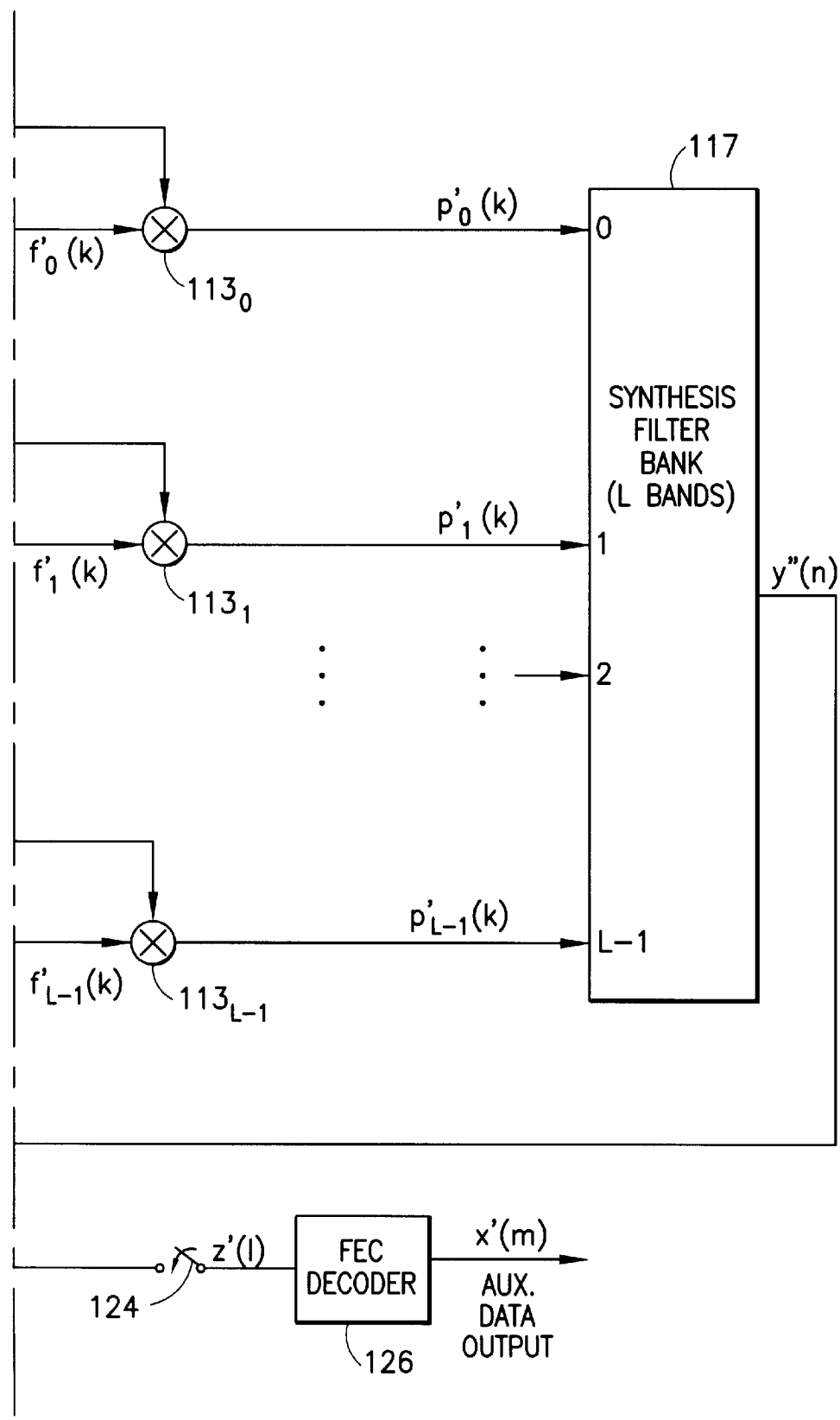

FIG. 6(b) is a detailed block diagram of the decoder of FIG. 6(a). Generally, to undo the spectral shaping and power adjustment applied at the encoder and recover the modulated PN signal p(n), the decoder must have the LPC filter coefficients used at the encoder. However, these coefficients are not necessarily transmitted by the encoder, even though the LPC order $N_i$ in each subband may be fixed and known to the decoder. Instead, the decoder may perform its own LPC analysis on the received signal components y'$_0$(k), y'$_1$(k), $\ldots$, y'$_{L-1}$(k) in each subband using corresponding LPC analysis functions $116_0, 116_1, \ldots, 116_{L-1}$, to estimate the LPC filter. The coefficients derived from the estimate, e.g., $\{a'_{01}, a'_{02}, \ldots, a'_{0N_0}\}, \{a'_{11}, a'_{12}, \ldots, a'_{1N_1}\}, \ldots, \{a'_{(L-1)1}, a'_{(L-1)2}, a'_{(L-1)NL-1}\}$, are input to corresponding LPC prediction filters $114_0, 114_1, \ldots, 114_{L-1}$, that are inverses of the corresponding LPC synthesis filters at the encoder, e.g., filters $94_0, 94_1, \ldots, 94_{L-1}$ in FIG. 5(c).

Since y'$_0$(k), y'$_1$(k), $\ldots$, y'$_{L-1}$(k), which are good replicas of $y_0(k), y_1(k), \ldots, Y_{L-1}(k)$, respectively, are the dominant components in each subband of the received signal, and, due to the averaging process embedded in the LPC analysis (providing a wide analysis window), the estimated LPC coefficients can be very close to the LPC coefficients used at the encoder.

Once the coefficients for the LPC prediction filters $114_0, 114_1, \ldots, 114_{L-1}$, e.g., $Ai'(z)=[1-(a'_{i1}z^{-1}+a'_{i2}z^{-2}+ \ldots +a'_{iN_i}z^{-N_i})]$ are found, the samples y'$_0$(k), y'$_1$(k), $\ldots$, y'$_{L-1}$(k) from the received signal, y'(n), are filtered at filters $114_0, 114_1, \ldots, 114_{L-1}$, respectively, to produce the residuals r'$_0$(k), r'$_1$(k), $\ldots$, r'$_{L-1}$(k), which are divided into the subband power control values, or amplitude adjustment signals, f'$_0$ (k), f'$_1$(k), . . . , f'$_{L-1}$(k) to obtain the modulated colored noise sequences, p'$_0$(k), p'$_1$(k), . . . , p'$_{L-1}$(k), respectively. The samples p'$_0$(k), p'$_1$(k), . . . , p'$_{L-1}$(k), are close replicas of the corresponding values used at the encoder, e.g., p$_0$(k), p$_1$(k), . . . , p$_{L-1}$(k), since the combined influence of the LPC synthesis filters 1/A$_i$(z) and the channel response H(z) for each subband is canceled by the LPC prediction filters A'$_i$(z).

As discussed in connection with FIGS. 2–4, the effect of received channel noise, g'(n), can be largely ignored due to a high processing gain. A'(z) removes much of the redundancy in the subband components y'$_0$(k), y'$_1$(k), . . . , y'$_{L-1}$(k) so that these components will have a flat, white spectrum. Additionally, the power in the subband components y'$_0$(k), y'$_1$(k), , y'$_{L-1}$(k) is lowered by a typically large prediction gain of the LPC filters A'i(z). Consequently, y'(k)+g'(k) becomes a white noise interference to p'(k) in each subband, which itself has a white noise spectrum. The remaining steps for recovering the auxiliary data from the modulated colored noise sequences p'(k) are similar to those used by the spread spectrum demodulator of FIGS. 4 and 6(a).

Still referring to FIG. 6(b), the same PN sequence synchronized to the PN sequence used at the encoder is multiplied with y"(n) using PN generator 118 and multiplier 120. A select circuit 128 is provided to select a desired PN chip offset and/or the PN sequence itself. The integration and dump circuit comprising summer 122 (with dummy summation index i) and switch 124 despreads and recovers z'(l) and integrates out much of the power in s"(n)+g'(n), where s"(n) is the interfering component from the primary data signal (e.g., audio), and g'(n) is the interfering component from channel noise. In the example embodiment illustrated, the correlation property of the PN sequence allows a constructive summation of all M=2000 chips in p(n) (e.g., output from multiplier 90 in FIG. 5(a)) to produce z'(l). In this example, switch 124 is switched at a rate of 15 Hz, and z'(l) has an SNR of about 3 dB (2:1), which is high enough for a simple FEC decoder with R=½ to reliably decode x'(m) at 7.5 bps. The signal to noise ratio (signal being za(l)) is improved by the processing gain G=n/l. Finally, the FEC decoder 126 performs the error correction necessary to produce a reliable estimate of the auxiliary data x'(m).

Figure 6C:
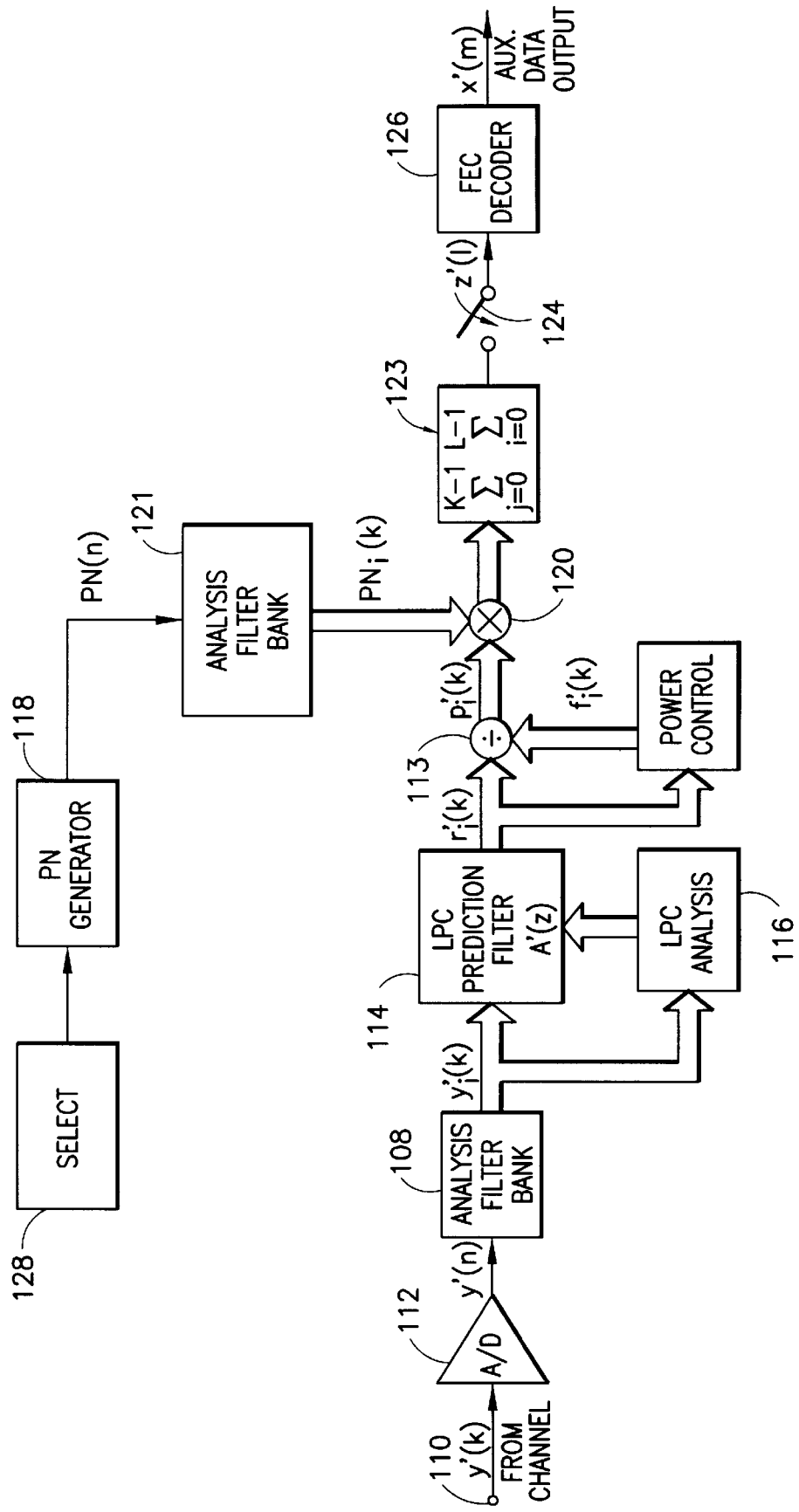

FIG. 6(c) is a high-level block diagram of an alternative embodiment of a decoder for recovering the hidden information output by the encoders of FIGS. 5(a)–5(c), with PN demodulation in the subband domain. This embodiment is in contrast to the decoders of FIG. 6(a) and 6(b), where PN de-correlation is performed in the full band domain.

Here, the PN sequence PN(n) provided by the PN generator 118 is frequency-decomposed by an L-band analysis filter bank 121 into subband PN carrier sequences PN$_i$(k), i=1, . . . , L, which are correlated with corresponding modulated colored noise sequences (e.g., subband prediction residual values) p'$_i$(k) at a multiplier 120. Recall that k is the subband sequence index, i is the subband number, and n is the full band sample index. The results of the correlations are integrated over K samples at a summer 123. The output of L such sums are accumulated by a switch 124 to produce the estimated symbol value z'(l). M=K×L is the symbol length. Finally, the FEC decoder 126 outputs the decoded auxiliary data signal x'(m).

Figure 6D:
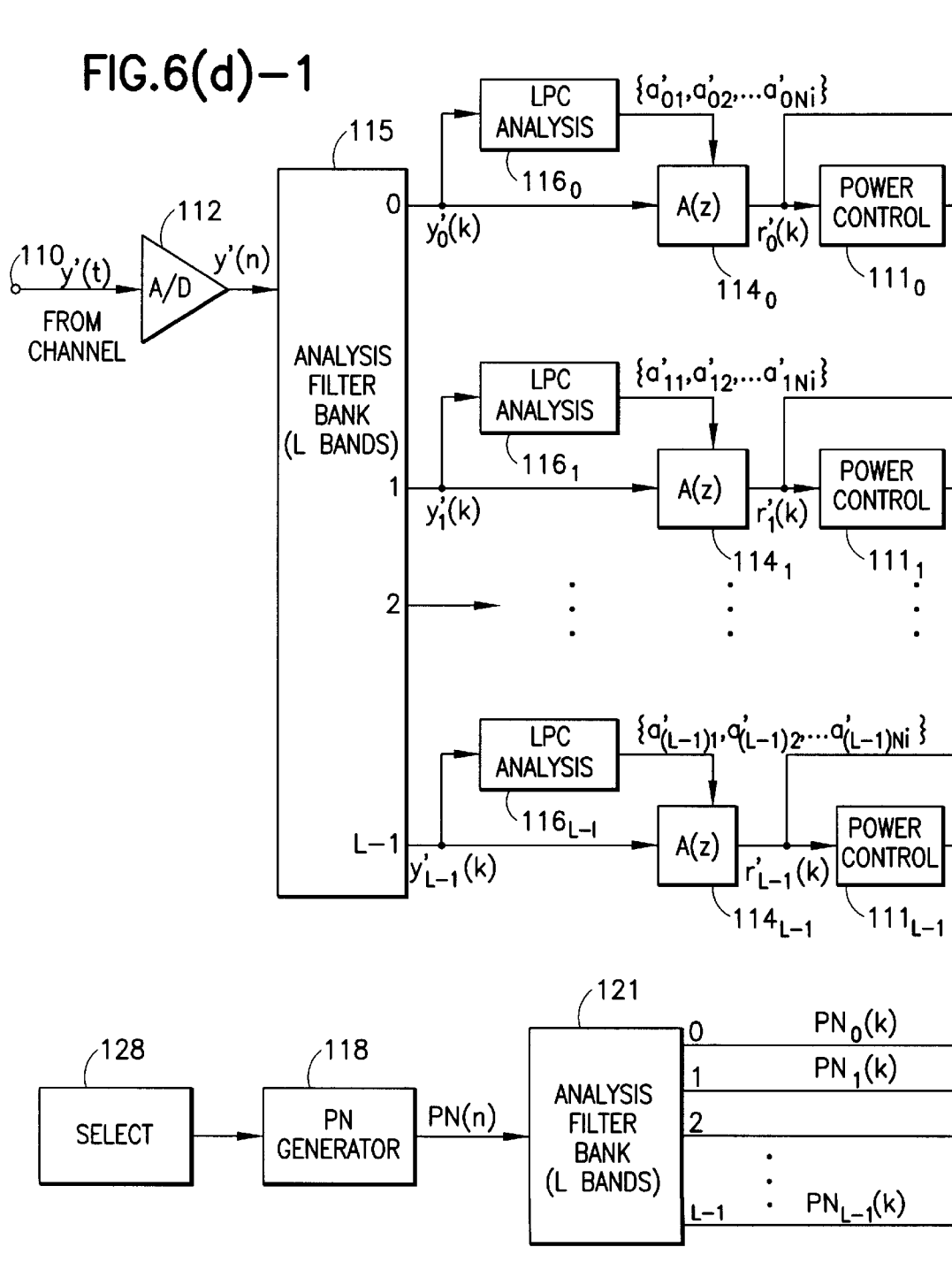
Figures 2, 6D:
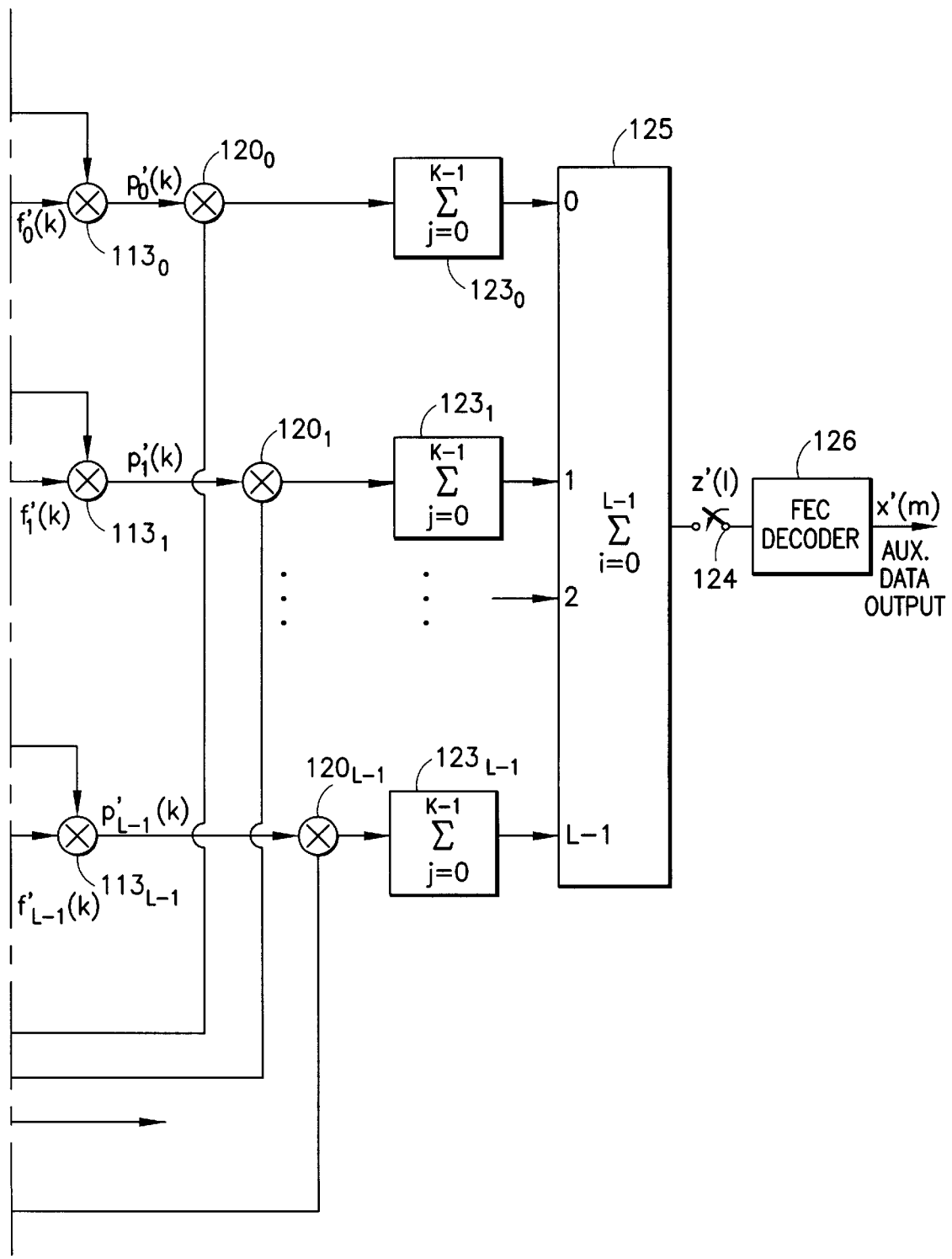

FIG. 6(d) is a detailed block diagram of the decoder of FIG. 6(c). The subband PN carrier sequences PN$_0$(k), PN$_1$(k), . . . , PN$_{L-1}$(k) are correlated with corresponding subband prediction residual values P$_0$(k), P$_i$(k), . . . , P$_{L-1}$(k) at respective multipliers 120$_0$(k), 120$_1$(k), . . . , 120$_{L-1}$(k) Furthermore, the summer 123 of FIG. 6(c) is shown comprising summers 123$_0$, 123$_1$, . . . , 123$_{L-1}$, that sum the respective outputs of the multipliers 120$_0$(k), 120$_1$(k), . . . , 120$_{L-1}$(k), and a summer 125 that sums the outputs of the summers 123$_0$, 123$_1$, . . . , 123$_{L-1}$ over the L subbands.

Note that, with the decoders of FIGS. 6(a)–6(d), the different processing components in each subband can be implemented using shared or independent hardware, firmware, and/or software.

Moreover, it is possible to transmit the LPC coefficients used at the encoder to the decoder as side information with y'(t) instead of deriving the LPC coefficients at the decoder.

Figures 7, 7A:
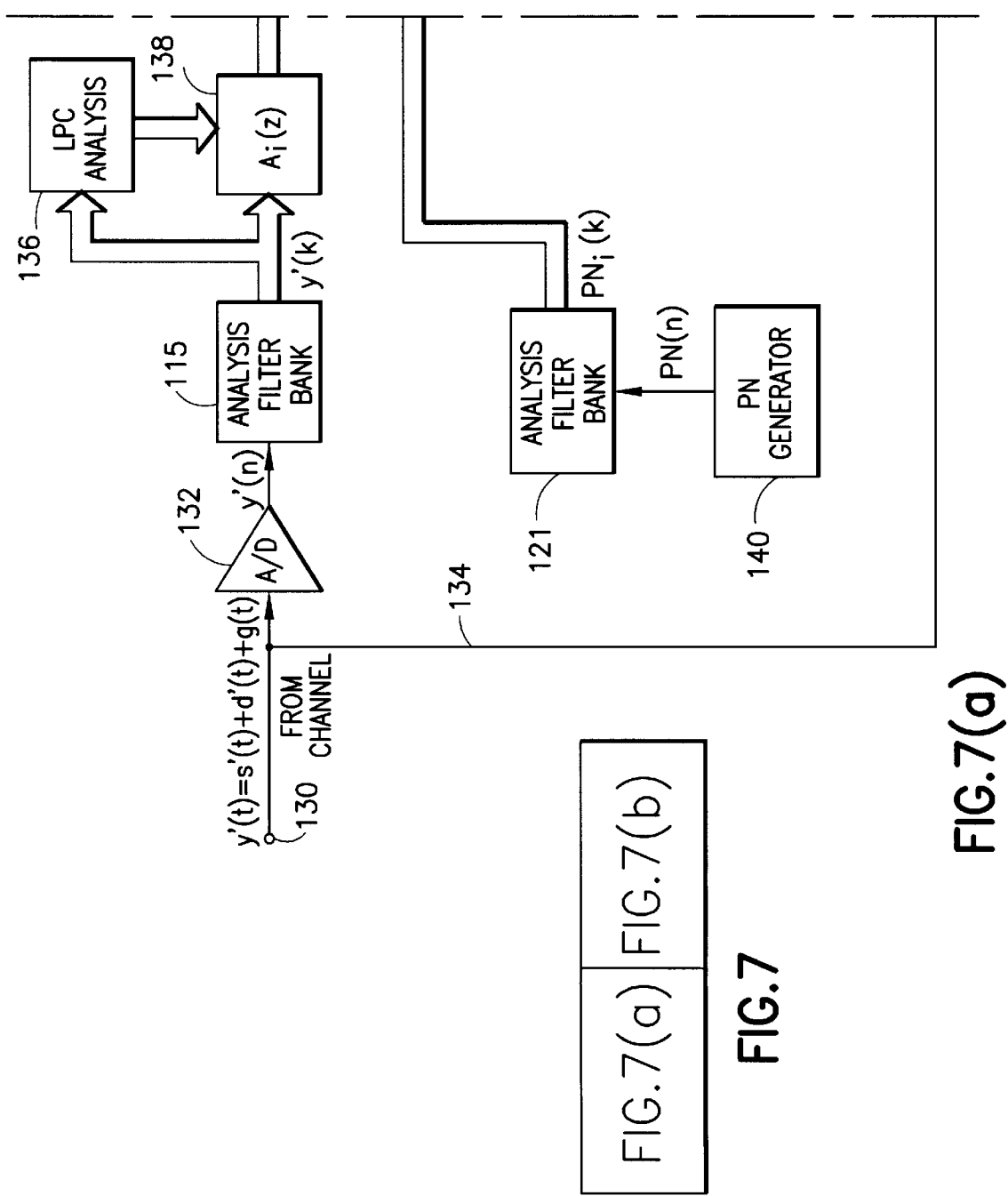
FIG. 7 is a block diagram of a hidden data transport decoder using a rake receiver.
Figure 7B:
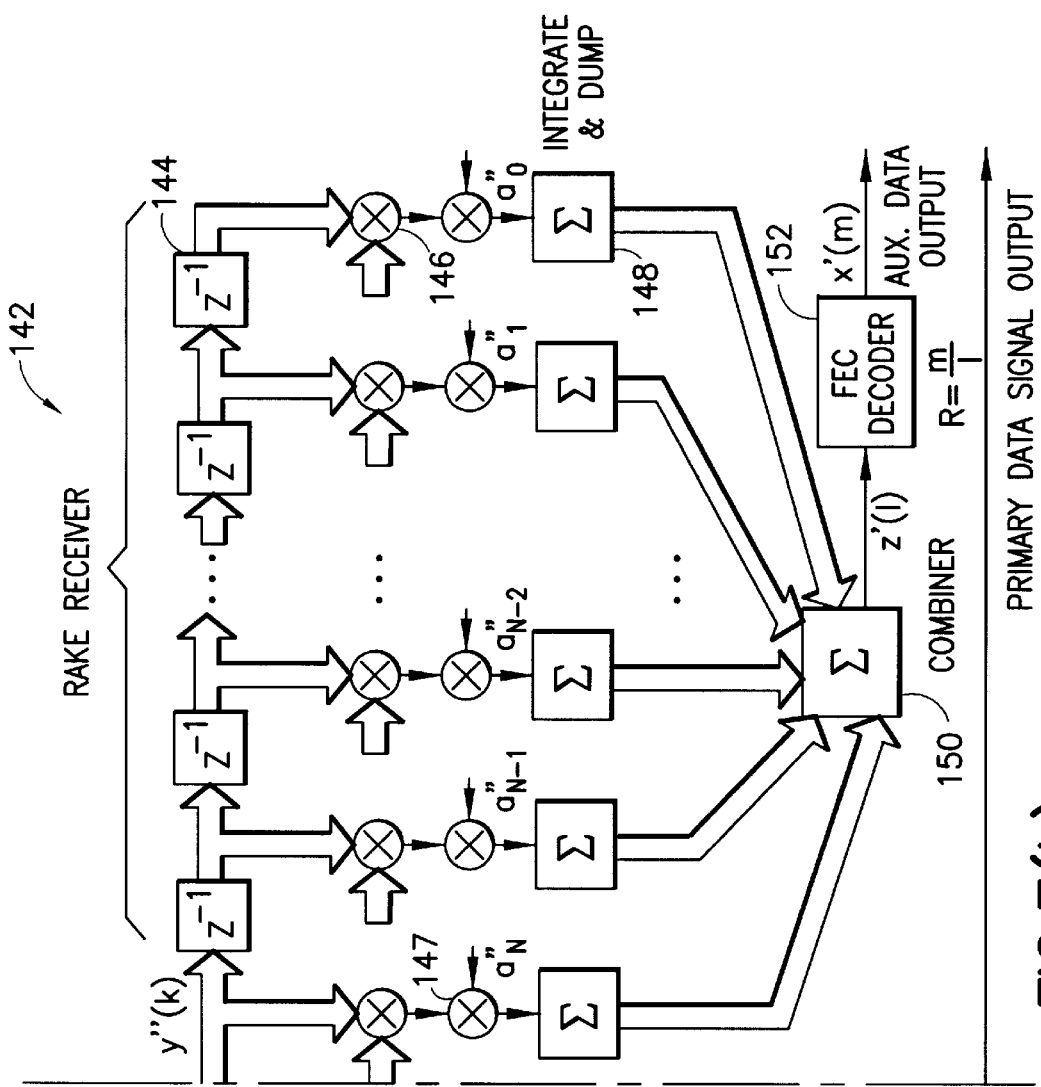

FIG. 7 illustrates an embodiment of a decoder using a rake receiver. This decoder is useful in decoding auxiliary information from a primary data signal produced by a white noise encoder of the type illustrated in FIG. 3. Although an uncolored white noise signal is more audible for a given power level than a colored noise signal with suitable spectral shaping, the performance of white noise signaling (e.g., as provided by the encoder of FIG. 3) can be significantly improved by a combination of an LPC filter and a rake receiver. This is achieved by using a much lower noise power than in the colored noise case, and relying on the LPC prediction gain at the receiver to reduce the interference power of the primary data signal. However, the LPC prediction filter A$_i$(z) for each ith subband will shape the noise signal while whitening the spectrum of the primary EM. This intersymbol interference introduced by A$_i$(z) is overcome by a rake receiver generally designated 142 in FIG. 7, which treats each coefficient of A$_i$(z) as a multipath component.

FIG. 7 illustrates such a decoder that uses an LPC prediction filter comprising LPC analyzer 136 and LPC filter 138 together with rake receiver 142. The number of taps or "fingers" of the rake receiver (N$_{r_i}$) must approximately match the order of the LPC filter, N$_i$ in each ith subband. Each finger includes a multiplier 146 that receives the PN$_i$(k) sequence from PN generator 140 and analysis filter bank 121, and a tap weight formed from a multiplier 147 that multiplies the output from the respective multiplier 146 by a respective tap weight.

The illustrated decoder utilizes a simple combining strategy that literally sums all the energy from each finger in a combiner 150 for each subband. This is accomplished by setting the tap weights to 1, e.g., a"$_0$=1, a"$_1$=1, a"$_2$=1, . . ., a"N$_i$=1 for each ith subband. A more optimal combining strategy can be implemented, which dynamically changes the weights on each finger depending on the LPC coefficients. For example, a constant term a"$_0$ can be set to 1, a"$_1$ can be set to equal the LPC coefficient a'$_1$, a"$_2$ can be set to equal LPC coefficient a'$_2$, and so on, where the LPC coefficients a'$_1$, a'$_2$. , a'N$_i$ are the coefficients computed locally by LPC analyzer 136 for each ith subband.

Prior to combiner 150, the weighted outputs for each finger are integrated and dumped using circuits 148 that correspond to components 122 and 124 of FIG. 6. The output of combiner 150, which combines the outputs from the circuits 148 across all L subbands, is decoded in FEC decoder 152, assuming that the original auxiliary information data was FEC encoded. The primary data signal received at terminal 130, which includes the auxiliary information as white noise, is output via line 134 for conventional processing.

The techniques of the present invention can be used to communicate a plurality of different auxiliary information signals on the same primary data signal. One embodiment of an encoder for accomplishing this is illustrated in FIG. 8.

Figure 8:
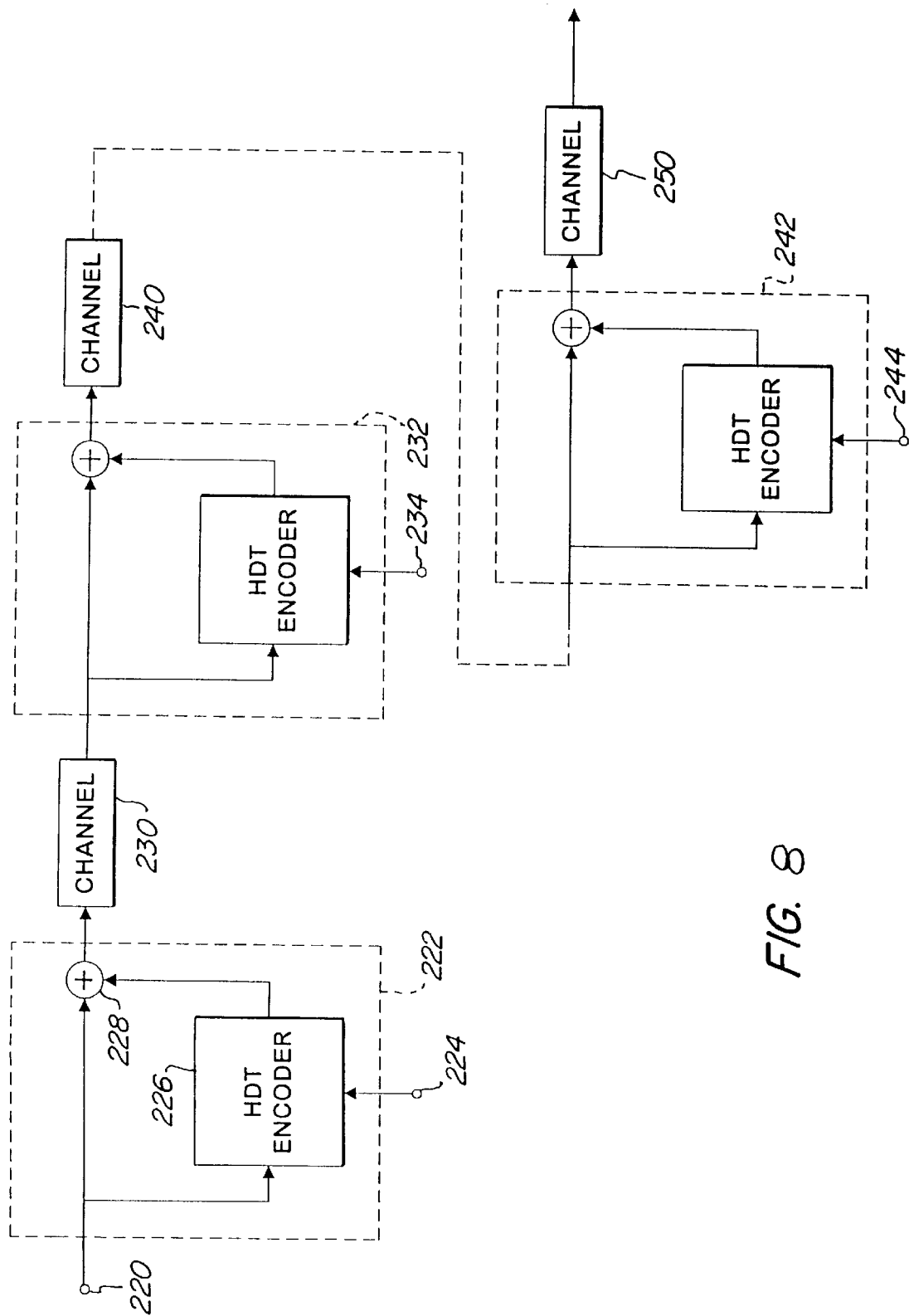
FIG. 8 is a series embodiment for hiding a plurality of auxiliary information signals on a primary data signal.

FIG. 8 shows a "cascaded" embodiment wherein the primary data signal is input via terminal 220. A first encoder 222 includes an HDT encoder 226 that adds a first auxiliary information signal input via terminal 224 to respective subbands of a primary data signal via combiner 228. The output of encoder 222 is communicated over a channel 230 to another encoder 232. This encoder can be identical to encoder 222, and adds a second auxiliary information signal input via terminal 234 to one or more of the subbands of the primary data signal which already contains the first auxiliary information signal. The output of encoder 232 is communicated via channel 240 to a subsequent encoder 242, which can be identical to encoders 222 and 232. Encoder 242 receives a third auxiliary information signal via terminal 244, and adds it to one or more of the subbands of the primary data signal already including the first and second auxiliary information signals. The output of encoder 242 is communicated via channel 250.

Advantageously, specific types of information may be carried in specific subbands of the primary data signal. For example, one subband may carry information regarding the title of an audio recording, while another subband carries information regarding the manufacturer, and so forth.

Any number of auxiliary information signals can be combined using cascaded encoders as illustrated in FIG. 8. Each HDT encoder 226 can include a power control (such as component 96 illustrated in FIG. 5(a)) to individually control the power level at which each auxiliary information signal is added to the primary data signal.

Figure 9B:
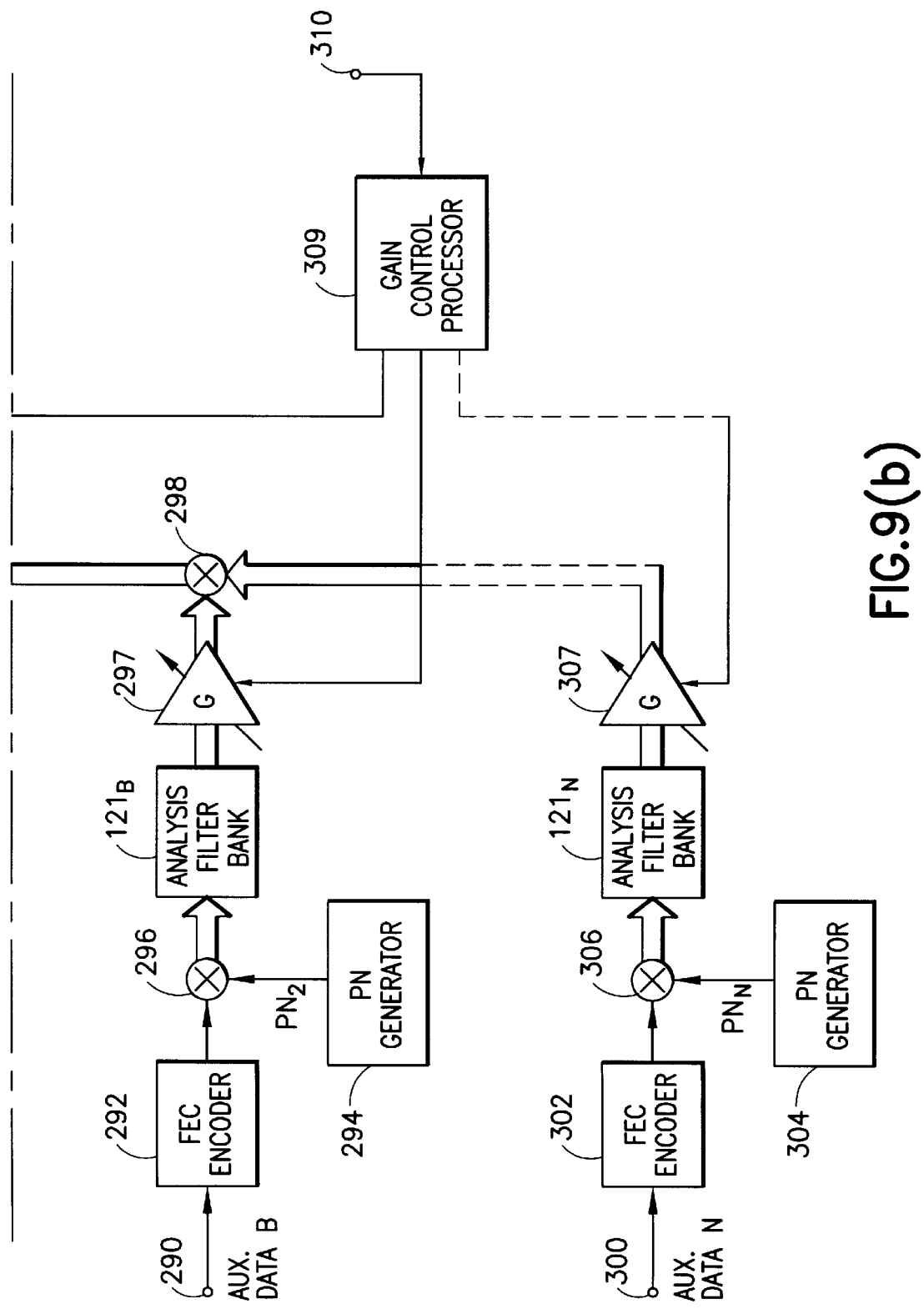
FIG. 9 is a parallel embodiment for hiding a plurality of auxiliary information signals on a primary data signal.

FIG. 9 illustrates an example wherein separate auxiliary information signals are processed to provide corresponding spread spectrum signals, which are combined for spectral shaping as a group in each subband of the primary data signal. The primary data signal is input via terminal 260 to an optional A/D converter 262, provided to an analysis filter bank, and the spectrum in each subband is analyzed by LPC analyzer 264. A first auxiliary information signal (or group of signals) (e.g., AUX. DATA A) is input to optional FEC encoder 282 via terminal 280. AUX. DATA A can be an individual stream or a combination of individual streams, and may comprise data and/or synchronization information. While each stream will be modulated on a spread spectrum carrier, an unmodulated carrier can also be transported, e.g., as a pilot signal. Such a pilot signal is useful for various synchronization purposes at a decoder, including acquisition and tracking, synchronizing the demodulator, PN sequence synchronization and/or FEC synchronization.

The signal input at terminal 280 is converted to a spread spectrum format using PN generator 284 and multiplier 286, and provided to an analysis filter bank $121_A$ to be frequency decomposed into a plurality of subbands. A second auxiliary information signal (e.g., AUX. DATA B), which may also comprise a combination of different data streams, is input to optional FEC encoder 292 via terminal 290, converted to a spread spectrum format by PN generator 294 and multiplier 296, and provided to analysis filter bank $121_B$. An Nth auxiliary information signal (e.g., AUX. DATA N), which may comprise a combination of different data streams, is input to optional FEC encoder 302 via terminal 300, converted to a spread spectrum signal by PN generator 304 and multiplier 306, then provided to analysis filter bank $121_N$. The second and Nth spread spectrum signals are combined in a combiner 298, and these are combined with the first spread spectrum signal in combiner 288. The use of "N" to designate the number of spread spectrum signals should not be confused with the use of $N_i$ elsewhere to designate the LPC model order for the ith subband.

The PN generators 284, 294 and 304 can all operate at the same or different rates. For example, if the data input to terminals 280, 290 and 300 is provided at different rates, the PN generators may be provided at different rates as a means of distinguishing the auxiliary information signals at a decoder. If all of the PN generators operate at the same rate, then their PN sequences will preferably all be orthogonal with respect to each other to facilitate distinguishing the different input data streams at the decoder, in accordance with well known spread spectrum demodulation techniques.

A variable gain stage can be provided after any or all of the multipliers 286, 296 and 306 for adjusting the gain of the corresponding spread spectrum signal in each path. Such gain stages 287, 297 and 307 are illustrated in FIG. 9. The gain of any path can be adjusted based on the gain(s) of any of the other paths, to provide the different auxiliary information signals at desired levels in the primary data signal. Allocation of the total combined signal gain among the auxiliary information signals in each path is provided by a gain analyzer and control processor 309 that sets and maintains a relative signal strength among the multiple streams and can independently adjust the appropriate gain stage(s) 287, 297 and/or 307 for adjusting the gain in each path, similar to the power control function 101 in FIGS. 5(a) and 5(b). A control input 310 is provided to enable manual or dynamic adjustment of the relative signal strength among the data streams. For example, a manual adjustment can be effected upon the installation of the apparatus. Alternatively, or in addition to a manual adjustment, dynamic control can be provided during the operation of the system.

The combined, gain adjusted spread spectrum signals output from combiner 288 are spectrally shaped in LPC synthesis filter 266 to simulate the spectral shape of the primary data signal. The resultant colored noise output in each subband is combined with the corresponding subband of the primary data signal in combiner 268, then provided to a synthesis filter bank 117 for conversion to a full band signal. D/A conversion for the full band signal is provided (if necessary) in converter 270. Moreover, instead of LPC analysis and filtering as illustrated in FIG. 9, any other suitable spectral shaping technique such as subband coding or bandpass filtering can be used.

Optionally, a power control circuit (not shown) such as power estimate and control circuit 96 of FIG. 5(a) can be used in the encoder of FIG. 9 to control the power of all of the auxiliary information signals as a group at the output of LPC synthesis filter 266. Such a power control circuit will enable the combined auxiliary information signals to be added to the primary data signal at a desired level, e.g., at a particular level below or above an acceptable interference threshold.

The combined signals provided by either of the encoders illustrated in FIGS. 8 and 9 can be recovered using a decoder of the type illustrated in FIGS. 6(a)–6(d). The decoder of FIGS. 6(a)–6(d) includes a selection control 128 that provides PN generator 118 with the necessary PN sequence to recover a desired one of the auxiliary information signals. For example, if it is desired to recover the auxiliary information input to terminal 290 of FIG. 9, selection control 128 of FIG. 6(a) will provide PN generator 118 with the information necessary to generate pseudorandom sequence $PN_2$, which is the sequence output by PN generator 294 in the encoder of FIG. 9.

Figure 10:
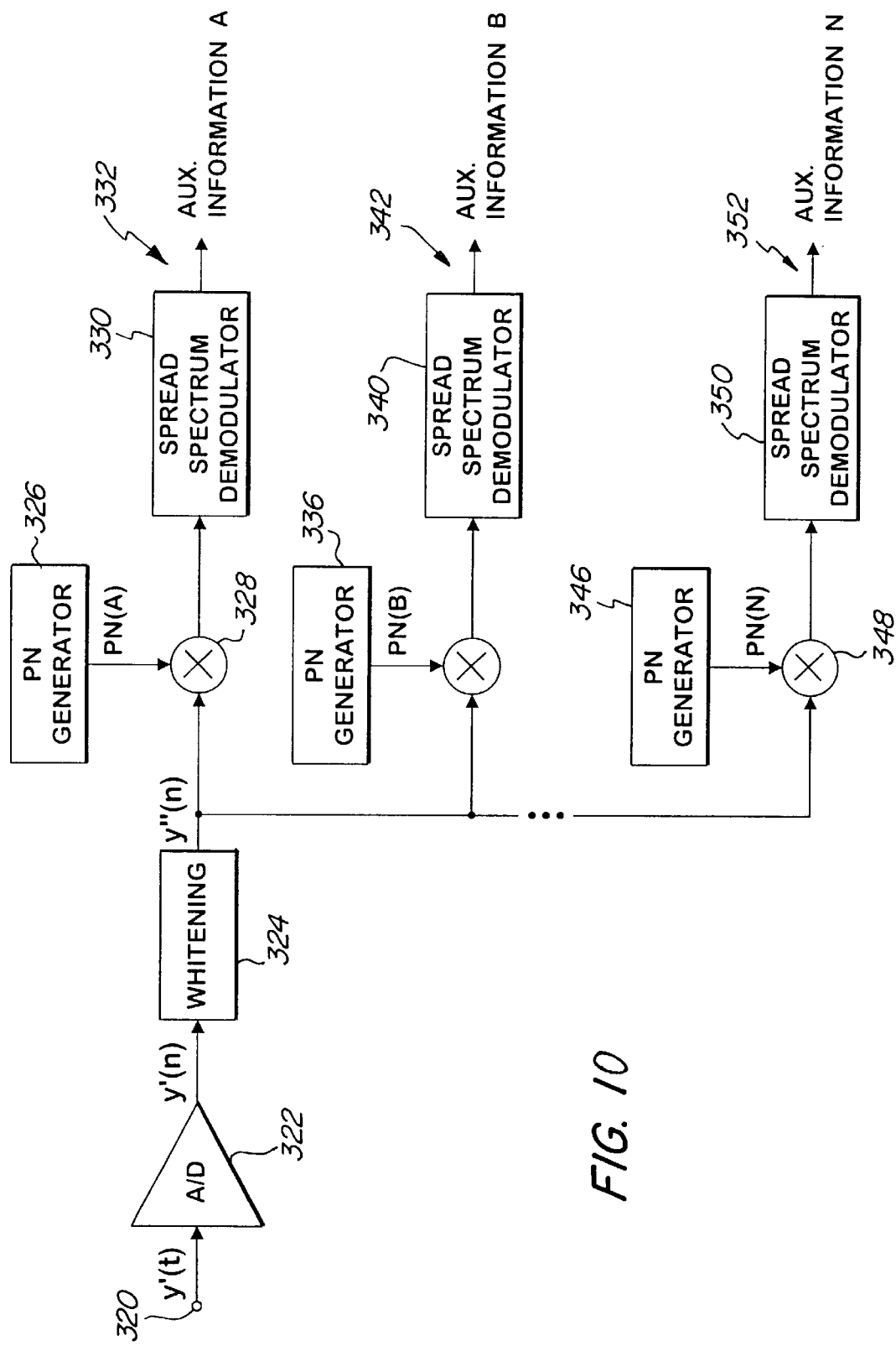
FIG. 10 is a block diagram of a decoder for simultaneously decoding a plurality of different auxiliary information signals embedded in a primary data signal.

FIG. 10 shows an embodiment where the decoders of FIGS. 6(a)–6(d) are modified to simultaneously decode a plurality of auxiliary information signals carried by the primary data signal. More particularly, the decoder receives, via terminal 320, the primary data signal having the auxiliary information signals hidden thereon as colored noise. If necessary, the input signal y'(t) is converted to the digital domain by an A/D converter 322. The resultant signal y'(n) is whitened using any available technique such as LPC analysis and prediction as shown by elements 114 and 116 in FIGS. 6(a)–6(d), by providing banks of bandpass filters for frequency filtering within the primary data signal bandwidth, or by any other suitable spectral shaping or filtering scheme. The decoder of FIG. 10 includes a plurality of stages 332, 342, 352, each receiving the whitened input signal y"(n). Each stage includes a PN generator (326, 336, 346) for recovering one of the plurality of auxiliary information signals. The PN generators can differentiate among the signals using any of a variety of techniques. For example, a different PN sequence can be used for each auxiliary information signal or different PN rates could be used to differentiate the signals. If the same PN rate is used for the different auxiliary information signals, then the PN sequences used will preferably all be orthogonal with respect to each other to facilitate signal differentiation and recovery.

The PN sequence output from each PN generator is input to a respective multiplier 328, 338, 348 that also receives the whitened primary data signal y"(n). The resultant output from each multiplier is input to a respective spread spectrum demodulator 330, 340 and 350 that outputs the corresponding auxiliary information signal. More particularly, stage 332 outputs auxiliary information signal "A" recovered using PN sequence PN(A), stage 342 outputs auxiliary information signal "B" using sequence PN(B), and stage 352 outputs auxiliary information signal "N" using sequence PN(N). The demodulators 330, 340 and 350 can comprise any suitable spread spectrum demodulator, such as the equivalent of "integrate and dump" components 122 and 124 shown in FIG. 6(a). Any required further processing of the signals output from the demodulators, such as FEC decoding, will be provided in a conventional manner.

The various other encoders and decoders illustrated in the figures can be similarly modified to handle multiple data streams embedded on one primary data signal. For example, the encoder of FIG. 3 can be provided with a plurality of stages, each comprising a separate PN generator 48, multiplier 46 and if necessary, A/D converter 50, for outputting different auxiliary information streams to combiner 52. Any required A/D conversion could alternatively be provided after the combiner. The decoder of FIG. 4 would be provided with a plurality of corresponding stages each having a PN is generator 66, multiplier 64 and integrate and dump stage 68 for recovering the different auxiliary information signals carried with the primary data signal. Any necessary gain and power control components would also be included in the various encoder stages to provide the auxiliary information signals at the desired level(s) within the primary data signal.

As seen, the present invention provides methods and apparatus for transporting auxiliary information in virtually any type of primary data signal. The auxiliary information is transported as colored noise, which is spectrally shaped to simulate the spectral shape of the primary data signal. The spectral shaping can be provided by any number of means, including LPC filtering and subband coding techniques. PN generators can be used to provide the auxiliary information in the form of spread spectrum signals that are subsequently spectrally shaped. Additionally, in any of the embodiments discussed herein, the spread spectrum signal may further be power adjusted, either before or after being spectrally shaped. Furthermore, to provide for the secure transmission of the auxiliary information, the PN generators can be keyed cryptographically, so that the counterpart PN sequence cannot be generated at a decoder without the corresponding cryptographic key. Moreover, a specific application for copy-protection of audio signals has been discussed.

In particular, frequency and time domain processing are used to provide auxiliary data in a number of subbands of a primary data signal, where the model order of the time domain process can be reduced in each subband relative to a full band implementation for comparable spectral modeling performance with reduced computational requirements. Moreover, the frequency and time domain technique provides improved spectral modeling of deep spectral valleys and spectral floors relative to a full band implementation.

Although the invention has been disclosed in connection with various specific embodiments, it will be appreciated by those skilled in the art that numerous adaptations and modifications may be made thereto without departing from the spirit and scope of the invention as set forth in the claims.

For example, subbands that are the same or different in bandwidth may be used. Moreover, FBLPC and SBLPC may be used together at different points in the distribution chain of the primary data signal. For example, for a primary data signal comprising audio, SBLPC may be used at the time of recording the audio, e.g., in a recording studio, while FBLPC is used later, e.g., at a manufacturing facility where a compact disc of the audio track is manufactured, or at a broadcast station where the audio track is broadcast in a radio or television signal.

What is claimed is:

1. A method for transporting auxiliary information in subbands of a primary data signal, comprising the steps of:
   (a) modulating a pseudorandom noise carrier by said auxiliary information to provide a spread spectrum signal carrying said information on a carrier portion thereof in a plurality of subbands corresponding to said subbands of said primary data signal;
   (b) evaluating said primary data signal in said subbands thereof using time domain modeling to obtain an approximation of its spectral shape; and
   (c) using time domain synthesis which is responsive to said time domain modeling to provide the carrier portion of said spread spectrum signal in subbands thereof with a spectral shape which simulates the spectral shape of said primary data signal in the corresponding subbands thereof, thereby producing a noise signal containing said auxiliary information to be carried in said subbands of said primary data signal.

2. The method of claim 1, wherein:
said primary data signal with said auxiliary information carried therein is provided as a full band signal for transmission across a communication channel.

3. The method of claim 1, wherein:
said noise signal has an adjusted power so that it is provided at a desired level in said subbands of said primary data signal; and
said power-adjusted noise signal is combined with said primary data signal to produce a combined output signal carrying said auxiliary information as noise in subbands thereof.

4. The method of claim 1, wherein:
said pseudorandom noise carrier is modulated by said auxiliary information to provide a full band spread spectrum signal; and
said full band spread spectrum signal is frequency decomposed to provide said spread spectrum signal carrying said information on said carrier portion thereof in said subbands thereof.

5. The method of claim 1, wherein:
said pseudorandom noise carrier has different frequency components that are modulated by corresponding frequency components of said auxiliary information to provide said spread spectrum signal carrying said information on a carrier portion thereof in said subbands thereof.

6. The method of claim 1, wherein:
said pseudorandom noise carrier is generated cryptographically to provide secure communication of said auxiliary information to a receiver.

7. The method of claim 1, wherein:
said time domain modeling comprises linear predictive coding (LPC) to provide LPC coefficients for use during said using step.

8. The method of claim 7, wherein:
said time domain modeling uses an LPC filter of order $N_i$ for each ith subband of said primary data signal; and
said LPC filter orders $N_i$ are not all the same.

9. A method for recovering said auxiliary information from a received primary data signal carrying the noise signal of claim 1, comprising the steps of:
(d) evaluating said received primary data signal in said subbands thereof using time domain modeling to approximate its spectral shape;
(e) processing the received primary data signal, based on the approximate spectral shape determined for said subbands thereof, to whiten the noise signal contained therein; and
(f) demodulating the whitened noise signal in said subbands of said received primary data signal to recover said auxiliary information.

10. The method of claim 9, wherein:
said time domain modeling in said evaluating step (d) comprises linear predictive coding (LPC) to provide LPC coefficients for use during said whitening step (e).

11. The method of claim 10, wherein:
said time domain modeling in said evaluating step (d) uses an LPC filter of order $N_i$ for each ith subband of said primary data signal; and
said LPC filter orders $N_i$ are not all the same.

12. The method of claim 10, wherein:
the LPC coefficients used during said whitening step (e) are derived from said received primary data signal independently of a derivation of LPC coefficients by said time domain modeling in said evaluating step (b).

13. The method of claim 9, wherein said received primary data signal is provided as a full band signal, comprising the further step of:
frequency decomposing said received primary data signal to provide said received primary data signal in said subbands thereof.

14. The method of claim 13, comprising the further steps of:
restoring said frequency decomposed received primary data signal with the whitened noise signal contained therein to a full band signal; and
demodulating the whitened noise signal in said restored full band signal to recover said auxiliary information.

15. The method of claim 13, wherein:
said frequency decomposed received primary data signal comprises the sum of said noise signal and said primary data signal in said subbands thereof.

16. The method of claim 1, wherein a plurality of auxiliary information signals are transported on said subbands of said primary data signal, said method comprising the further steps of:

modulating a plurality of pseudorandom noise carriers by corresponding ones of said auxiliary information signals to provide a plurality of spread spectrum signals in different subbands corresponding to said subbands of said primary data signal;
providing said carriers with a spectral shape to simulate the spectral shape of said primary data signal in said subbands thereof; and
combining the carriers with said primary data signal to produce an output signal carrying said auxiliary information signals as noise in said subbands of said primary data signal.

17. The method of claim 16, wherein:
each of said carriers is individually spectrally shaped prior to its combination with said primary data signal.

18. The method of claim 16, wherein:
said carriers are spectrally shaped as a group prior to their combination with said primary data signal.

19. The method of claim 16, wherein:
at least one of said carriers is individually spectrally shaped prior to its combination with said primary data signal, and
at least two other of said carriers are spectrally shaped as a group prior to their combination with said primary data signal.

20. The method of claim 16, wherein:
the carriers are combined with said primary data signal such that at least one of said carriers is combined with said primary data signal after said primary data signal has already been combined with at least one other of said carriers.

21. The method of claim 16, comprising the further step of:
providing at least one of a modulated or unmodulated pseudorandom noise carrier as a pilot signal for use in synchronizing a receiver function.

22. The method of claim 16, comprising the further step of:
adjusting the gain of at least one of said carriers prior to its combination with said primary data signal.

23. The method of claim 16, wherein:
a group of said carriers has an adjusted power so that the group is provided at a desired level in said primary data signal.

24. The method of claim 16, wherein:
a gain of at least a first one of the carriers is determined; and
a gain of at least a second one of the carriers is adjusted in response to the gain determined for the at least one first carrier.

25. The method of claim 24, wherein:
a group of at least said first and second carriers has an adjusted power so that the group is provided at a desired level in said primary data signal.

26. The method of claim 16, wherein:
at least two of said carriers are provided at different data rates.

27. A method for recovering said auxiliary information from the output signal of claim 16, comprising the steps of:
evaluating said output signal to approximate its spectral shape in said subbands thereof;
processing the output signal, based on the approximate spectral shape determined therefor, to whiten said noise; and demodulating a desired spread spectrum signal after said noise has been whitened to recover the auxiliary information carried in said subbands.

28. The method of claim 27, wherein:

a plurality of said spread spectrum signals are demodulated substantially simultaneously from said output signal.

29. Apparatus for transporting auxiliary information in subbands of a primary data signal for communication to a receiver, comprising:

means for converting a data stream of said auxiliary information into a spread spectrum signal carrying said information in a plurality of subbands corresponding to said subbands of said primary data signal;

first means for evaluating said primary data signal in said subbands thereof using time domain modeling to obtain an approximation of its spectral shape; and a time domain synthesizer responsive to said evaluating means for providing a carrier portion of said spread spectrum signal with a spectral shape in subbands thereof which simulates the spectral shape of said primary data signal in the corresponding subbands thereof, thereby producing a noise signal containing said auxiliary information to be carried in said subbands of said primary data signal.

30. The apparatus of claim 29, further comprising:

means for providing said primary data signal as a full band signal for transmission across a communication channel.

31. The apparatus of claim 29, further comprising:

means for providing said noise signal with an adjusted power so that said noise signal is provided at a desired level in said subbands of said primary data signal.

32. The apparatus of claim 29, further comprising:

means for modulating said pseudorandom noise carrier by said auxiliary information to provide said spread spectrum signal as a full band spread spectrum signal; and means for frequency decomposing said full band spread spectrum signal to provide said spread spectrum signal carrying said information on said carrier portion thereof in said subbands thereof.

33. The apparatus of claim 29, wherein:

said pseudorandom noise carrier has different frequency components that are modulated by corresponding frequency components of said auxiliary information to provide said spread spectrum signal carrying said information on a carrier portion thereof in said subbands thereof.

34. The apparatus of claim 29, wherein:

said pseudorandom noise carrier is generated cryptographically to provide secure communication of said auxiliary information to a receiver.

35. The apparatus of claim 29, wherein:

said first evaluating means comprise a linear predictive coding (LPC) processor coupled to receive said primary data signal and generate LPC coefficients therefrom; and said time domain synthesizer comprises an LPC filter responsive to said LPC coefficients.

36. The apparatus of claim 35, wherein:

said LPC processor uses an order $N_i$ for each ith subband of said primary data signal; and said orders $N_i$ are not all the same.

37. Apparatus for recovering said auxiliary information from a received primary data signal carrying the noise signal provided by the apparatus of claim 29, comprising:

second means for evaluating said subbands of said received primary data signal using time domain modeling to approximate its spectral shape;

a time domain processor for processing the received primary data signal in said subbands, based on the spectral shape determined therefor, to whiten the noise signal contained therein; and means for demodulating the whitened noise signal in said subbands to recover said data stream of said auxiliary information.

38. The apparatus of claim 37, wherein:

said time domain modeling used by said second evaluating means comprises linear predictive coding (LPC) to provide LPC coefficients for use by said time domain processor in whitening said noise signal.

39. The apparatus of claim 38, wherein:

said time domain modeling used by said second evaluating means uses an LPC filter of order $N_i$ for each ith subband of said primary data signal; and said LPC filter orders $N_i$ are not all the same.

40. The apparatus of claim 38, wherein:

the LPC coefficients provided by said second evaluating means are derived from said received primary data signal independently of a derivation of LPC coefficients by said first evaluating means.

41. The apparatus of claims 37, wherein said received primary data signal is provided as a full band signal, further comprising:

means for frequency decomposing said received primary data signal to provide said received primary data signal in said subbands thereof.

42. The apparatus of claim 41, further comprising:

means for restoring said frequency decomposed received primary data signal with the whitened noise signal contained therein to a full band signal; and means for demodulating the whitened noise signal in said restored full band signal to recover said auxiliary information.

43. The apparatus of claim 41, wherein:

said frequency decomposed received primary data signal comprises the sum of said noise signal and said primary data signal in said subbands thereof.

44. The apparatus of claim 29, wherein a plurality of auxiliary information signals are transported on said subbands of said primary data signal, further comprising:

means for modulating a plurality of pseudorandom noise carriers by corresponding ones of said auxiliary information signals to provide a plurality of spread spectrum signals in different subbands corresponding to said subbands of said primary data signal;

means for providing said carriers with a spectral shape to simulate the spectral shape of said primary data signal in said subbands thereof; and means for combining the carriers with said primary data signal to produce an output signal carrying said auxiliary information signals as noise in said subbands of said primary data signal.

45. The apparatus of claim 44, wherein:

each of said carriers is individually spectrally shaped prior to its combination with said primary data signal.

46. The apparatus of claim 44, wherein:

said carriers are spectrally shaped as a group prior to their combination with said primary data signal.

47. The apparatus of claim 44, wherein:
at least one of said carriers is individually spectrally shaped prior to its combination with said primary data signal, and
at least two other of said carriers are spectrally shaped as a group prior to their combination with said primary data signal.

48. The apparatus of claim 44, wherein:
the carriers are combined with said primary data signal such that at least one of said carriers is combined with said primary data signal after said primary data signal has already been combined with at least one other of said carriers.

49. The apparatus of claim 44, further comprising:
means for providing at least one of a modulated or unmodulated pseudorandom noise carrier as a pilot signal for use in synchronizing a receiver function.

50. The apparatus of claim 44, further comprising:
means for adjusting the gain of at least one of said carriers prior to its combination with said primary data signal.

51. The apparatus of claim 44, wherein:
a group of said carriers has an adjusted power so that the group is provided at a desired level in said primary data signal.

52. The apparatus of claim 44, wherein:
a gain of at least a first one of the carriers is determined; and
a gain of at least a second one of the carriers is adjusted in response to the gain determined for the at least one first carrier.

53. The apparatus of claim 52, wherein:
a group of at least said first and second carriers has an adjusted power so that the group is provided at a desired level in said primary data signal.

54. The apparatus of claim 44, wherein:
at least two of said carriers are provided at different data rates.

55. An apparatus for recovering said auxiliary information from the output signal of claim 44, comprising:
second means for evaluating said output signal to approximate its spectral shape in said subbands thereof;
means for processing the output signal, based on the approximate spectral shape determined therefor, to whiten said noise; and
means for demodulating a desired spread spectrum signal after said noise has been whitened to recover the auxiliary information carried in said subbands.

56. The apparatus of claim 55, wherein:
a plurality of said spread spectrum signals are demodulated substantially simultaneously from said output signal.

57. A decoder for recovering auxiliary information carried by a spread spectrum signal that is transported as noise in subbands of a primary data signal, said spread spectrum signal including a carrier having a spectral shape which simulates the spectral shape of information contained in said subbands of said primary data signal, said decoder comprising:
means for evaluating said subbands of said primary data signal using time domain modeling to approximate the primary data signal's spectral shape;
a time domain processor for processing the primary data signal, based on the spectral shape determined therefor, to whiten the spread spectrum carrier contained in said subbands; and
means for demodulating the whitened carrier to recover said auxiliary information from said subbands.

58. The decoder of claim 57, wherein:
said evaluating means comprise a linear predictive coding (LPC) processor coupled to receive said primary data signal and generate LPC coefficients therefrom; and
said time domain processor comprises an LPC filter responsive to said LPC coefficients.

59. The decoder of claim 57, wherein:
a plurality of auxiliary information signals are carried on respective carriers of said spread spectrum signal, all of said carriers having a spectral shape which simulates the spectral shape of said primary data signal information; and
said demodulator means include means for selecting at least one desired carrier for demodulation to enable the recovery of at least one corresponding auxiliary information signal.

60. The decoder of claim 57, wherein:
a plurality of auxiliary information signals are carried on respective carriers of said spread spectrum signal, all of said carriers having a spectral shape which simulates the spectral shape of said primary data signal information; and
said demodulator means include means for substantially simultaneously demodulating a plurality of said carriers to enable the substantially simultaneous recovery of said auxiliary information signals.

61. The decoder of claims 57, further comprising:
first frequency decomposing means for providing said primary data signal in said subbands thereof;
said evaluating means responsive to said frequency decomposing means; and
second frequency decomposing means for providing said carrier of said spread spectrum signal in a plurality of subbands corresponding to said subbands of said primary data signal;
wherein the spectral shape of said subbands of said carrier simulates the spectral shape of the corresponding subbands of said primary data signal.

62. The decoder of claim 58, wherein:
said time domain modeling used by said evaluating means uses an LPC filter of order $N_i$ for each ith subband of said primary data signal; and
said LPC filter orders $N_i$ are not all the same.

63. The decoder of claim 57, wherein:
the LPC coefficients provided by said evaluating means are derived independently from said received primary data signal.

64. The decoder of claims 57, wherein said received primary data signal is provided as a full band signal, further comprising:
means for frequency decomposing said received primary data signal to provide said received primary data signal in said subbands thereof.

65. The decoder of claim 64, further comprising:
means for restoring said frequency decomposed received primary data signal with the whitened noise signal contained therein to a full band signal; and
means for demodulating the whitened noise signal in said restored full band signal to recover said auxiliary information.

66. The decoder of claim 64, wherein:
said frequency decomposed received primary data signal comprises the sum of said noise signal and said primary data signal in said subbands thereof.

67. A decoder for recovering auxiliary information carried by a spread spectrum signal transported as noise in subbands of a primary data signal, comprising:

means for whitening a spectrum of said primary data signal, said whitening means creating intersymbol interference in said spread spectrum signal; and a rake receiver for receiving and demodulating said primary data signal from said whitening means; wherein:

said rake receiver has a plurality of fingers for processing different multipaths of said spread spectrum signal when demodulating the received primary data signal, thereby recovering said spread spectrum signal with reduced intersymbol interference in order to obtain said auxiliary information therefrom; and spectral shapes of subbands of a carrier portion of said spread spectrum signal approximate corresponding spectral shapes of corresponding ones of said subbands of said primary data signal.

68. The decoder of claim 67, wherein said whitening means comprise:

a linear predictive coding (LPC) processor coupled to receive said primary data signal and generate LPC coefficients therefrom; and an LPC filter of order $N_i$ for each ith subband of said primary data signal, said LPC filter receiving said primary data signal and responsive to said LPC coefficients for whitening said spectrum of said primary data signal;

said rake receiver comprising $N_{rr_i}$ fingers for each ith subband of said primary data signal, where $N_{rr_i}$ is approximately equal to the order of said LPC filter for the corresponding ith subband.

69. The decoder of claim 67, wherein said whitening means comprise:

a subband analyzer coupled to receive and estimate the spectrum of said primary data signal; and a subband filter responsive to the spectrum estimated by said subband analyzer.

70. The decoder of claim 67, wherein each of said fingers has an associated weight, said rake receiver further comprising:

means for individually adjusting the weights of said rake receiver fingers.

71. The decoder of claim 70, wherein:

the weights of said rake receiver fingers are dynamically adjustable.

72. The decoder of claim 71, wherein:

said weights are dynamically adjustable in response to coefficients generated by said whitening means.

73. The decoder of claim 67, wherein said primary data signal is received at said decoder as a full band signal, further comprising:

means for frequency decomposing said received primary data signal to provide said primary data signal in said subbands thereof.

74. The decoder of claim 67, further comprising:

means for frequency decomposing said spread spectrum signal transported as noise into subbands corresponding to said subbands of said primary data signal to provide a plurality of subband spread spectrum signals for use by said rake receiver.

75. A data signal embodied in a carrier wave, comprising:

a primary data signal portion having a plurality of subbands thereof; and a noise signal portion comprising a spread spectrum signal carrier, said noise signal portion being carried in said subbands of said primary data signal; wherein:

said spread spectrum signal carrier carries auxiliary information, and has a spectral shape in subbands thereof which simulates the spectral shape of said primary data signal in corresponding subbands thereof;

wherein said spread spectrum signal carrier is obtained by:

modulating a pseudorandom noise carrier by said auxiliary information;

evaluating said primary data signal in said subbands thereof using time domain modeling to obtain an approximation of its spectral shape; and using time domain synthesis which is responsive to said time domain modeling to provide said spread spectrum signal carrier in subbands thereof with a spectral shape which simulates the spectral shape of said primary data signal in the corresponding subbands thereof.

76. The data signal of claim 75, wherein:

said noise signal portion comprises a plurality of spread spectrum signal carriers obtained by modulating a corresponding plurality of pseudorandom noise carriers by corresponding auxiliary information signals;

said plurality of spread spectrum signal carriers are provided in different subbands of said noise signal portion corresponding to said subbands of said primary data signal; and time domain synthesis which is responsive to time domain modeling is used to provide said plurality of spread spectrum signal carriers in said subbands thereof with corresponding spectral shapes which simulate the spectral shape of said primary data signal in the corresponding subband thereof.

77. A decoding method for recovering auxiliary information carried by a spread spectrum signal that is transported as noise in subbands of a primary data signal, said spread spectrum signal including a carrier having a spectral shape which simulates the spectral shape of information contained in said subbands of said primary data signal, comprising the steps of:

evaluating said subbands of said primary data signal using time domain modeling to approximate the primary data signal's spectral shape; performing time domain processing of the primary data signal, based on the spectral shape determined therefor, to whiten the spread spectrum carrier contained in said subbands; and demodulating the whitened carrier to recover said auxiliary information from said subbands.

78. The method of claim 77, wherein:

in said evaluating step, a linear predictive coding (LPC) processor is coupled to receive said primary data signal and generate LPC coefficients therefrom; and the time domain processing uses LPC filtering responsive to said LPC coefficients.

79. The method of claim 77, wherein:

a plurality of auxiliary information signals are carried on respective carriers of said spread spectrum signal, all of said carriers having a spectral shape which simulates the spectral shape of said primary data signal information; and in said demodulator step, at least one desired carrier is selected for demodulation to enable the recovery of at least one corresponding auxiliary information signal.

80. The method of claim 77, wherein:
- a plurality of auxiliary information signals are carried on respective carriers of said spread spectrum signal, all of said carriers having a spectral shape which simulates the spectral shape of said primary data signal information; and
- in said demodulating step, a plurality of said carriers are demodulated substantially simultaneously to enable the substantially simultaneous recovery of said auxiliary information signals.

81. The method of claims 77, comprising the further steps of:
- using first frequency decomposing to provide primary data signal in said subbands thereof;
- wherein said evaluating step is responsive to said frequency decomposing; and
- using second frequency decomposing for providing said carrier of said spread spectrum signal in a plurality of subbands corresponding to said subbands of said primary data signal;
- wherein the spectral shape of said subbands of said carrier simulates the spectral shape of the corresponding subbands of said primary data signal.

82. The method of claim 78, wherein:
- the time domain modeling used by said evaluating step uses an LPC filter of order $N_i$ for each ith subband of said primary data signal; and
- said LPC filter orders $N_i$ are not all the same.

83. The method of claim 77, wherein:
- the LPC coefficients provided by said evaluating step are derived independently from said received primary data signal.

84. The method of claims 77, wherein said received primary data signal is provided as a full band signal, comprising the further step of:
- frequency decomposing said received primary data signal to provide said received primary data signal in said subbands thereof.

85. The method of claim 84, comprising the further steps of:
- restoring said frequency decomposed received primary data signal with the whitened noise signal contained therein to a full band signal; and
- demodulating the whitened noise signal in said restored full band signal to recover said auxiliary information.

86. The method of claim 84, wherein:
- said frequency decomposed received primary data signal comprises the sum of said noise signal and said primary data signal in said subbands thereof.

* * * * *